United States Patent [19]

Kimura et al.

[11] Patent Number: 5,423,000
[45] Date of Patent: Jun. 6, 1995

[54] OPERATION CONTROL TECHNIQUE FOR COMPUTER SYSTEM BY DRIVING A COMMAND PROCEDURE WITH REFERENCE TO EVENTS RECORDED ON A LOGGING STORAGE COMPUTER OPERATION CONTROL BY AUTOMATIC DECISION MAKING BASED ON EVENTS ON A LOGGING STORAGE

[75] Inventors: Ikuo Kimura, Yamato; Masaaki Hama, Fujisawa; Yoshikazu Ichikawa, Yokohama; Masahiko Ishimaru, Fujisawa; Toshio Hirosawa, Machida; Jun'ichi Kurihara, Mitaka; Hitoshi Ueno, Zama; Yoshimasa Yamamoto; Kozi Miyazima, both of Hadano; Akira Ando, Sagamihara, all of Japan

[73] Assignees: Hitachi, Ltd.; Hitachi Software Engineering Co., Ltd., both of Tokyo, Japan

[21] Appl. No.: 133,280

[22] Filed: Oct. 7, 1993

Related U.S. Application Data

[63] Continuation of Ser. No. 411,894, Sep. 25, 1989, abandoned.

[30] Foreign Application Priority Data

Sep. 26, 1988 [JP] Japan ................... 63-238728

[51] Int. Cl.⁶ ............................................. G06F 3/00
[52] U.S. Cl. ................... 395/200; 395/800; 395/575; 395/275; 395/650
[58] Field of Search ........... 395/800, 575, 200, 325, 395/275, 375, 600, 650

[56] References Cited

U.S. PATENT DOCUMENTS

| | | | |
|---|---|---|---|
| 4,377,000 | 3/1983 | Staab | 371/11 |
| 4,648,031 | 3/1987 | Jenner | 395/575 |
| 4,891,639 | 1/1990 | Nakamura | 340/525.5 |
| 4,894,828 | 1/1990 | Novy et al. | 371/11.3 |
| 5,003,464 | 3/1991 | Ely et al. | 371/11.3 |
| 5,049,873 | 9/1991 | Robins et al. | 340/825.06 |
| 5,084,816 | 1/1992 | Boese et al. | 395/575 |
| 5,134,712 | 7/1992 | Yamamoto | 395/575 |

FOREIGN PATENT DOCUMENTS 0176342 4/1986 European Pat. Off. .
0221274 6/1987 European Pat. Off. .
2189061 10/1987 United Kingdom .

OTHER PUBLICATIONS

"Method for Minimizing The Information Difference Between Alive and Log-Based Recovery in Transaction System Using Incremental Instead of Periodic Cheek Pointing" IBM TDB Aug. 1987.
Cole, "Network Management As Described in System Network Architecture", 1986, IEEE.
Wilbur, "Local Area Network Management for Distributed Applications" Apr. 1986, Computer Communications.
Stankovic, "A Perspective on Distributed Computer Systems", Dec. 1984; IEEE Transaction on Computers.
Rasala et al. "Fault Tolerant Archeitures the Tandern Approach" 1985, Proc. of the NCF.

*Primary Examiner*—Alyssa H. Bowler
*Assistant Examiner*—L. Donaghue
*Attorney, Agent, or Firm*—Antonelli, Terry, Stout & Kraus

[57] ABSTRACT

An automatic operation control system for controlling the automatic operation of a computer system, stores in a storage unit the status informations of hardware configuration and software configuration of a computer system, a running event of the operating system and application programs, and an operation event of the computer system, and supplies a procedure for an operation command to be executed in accordance with the configuration information and the occurred event.

13 Claims, 26 Drawing Sheets

FIG.3B

CONFIGURATION STATE INFORMATION MEMBER 110

| ITEM | TYPE OF INFORMATION RECORD |
|---|---|
| 1 | AUTOMATIC OPERATION MONITOR CONTROL UNIT RECORD |
| 2 | CPU RECORD |
| 3 | INPUT/OUTPUT CONTROL UNIT RECORD |
| 4 | INPUT/OUTPUT DEVICE RECORD |
| 5 | GENERAL CONTACT RECORD |
| 6 | SVP RECORD |
| 7 | CONSOLE RECORD |
| 8 | POWER ON/OFF CONTROL RECORD |
| 9 | CHANGE CONTROL RECORD |
| 10 | SYSTEM START CONTROL RECORD |
| 11 | PROGRAM CONFIGURATION RUNNING STATE RECORD |
| ⋮ | |
| N | GROUP CONTROL RECORD |

FIG. 4A    INPUT/OUTPUT DEVICE RECORD

| ITEM | INFORMATION TYPE | | MEANING | CONTENTS |
|---|---|---|---|---|
| | CONFIGURATION INFORMATION | | | |
| 1 | SPECIFIC INFORMATION | | LOGICAL DEVICE SYMBOL NAME | K01 |
| 2 | | | DEVICE ADDRESS | 101 |
| 3 | | | DEVICE TYPE | H-8595 |
| 4 | | | APPLICATION FIELD | ON-LINE JOURNAL |
| | | | --- | |
| 5 | CONNECTION INFORMATION | | NAME OF CONNECTED INPUT/OUTPUT CONTROL UNIT | C01 |
| 6 | | | NAME OF GENERAL CONTACT CLOSING UPON ACCIDENT | SW1 |
| | | | --- | |
| | EVENT INFORMATION | | | |
| 7 | STATE INFORMATION | | USABLE OR NOT | ON-LINE/OFF-LINE |
| 8 | | | PRESENCE/ABSENCE OF ACCIDENT | NORMAL/ABNORMAL |
| | | | --- | |

FIG.4B

| ITEM | INFORMATION TYPE | | MEANING | CONTENTS |
|---|---|---|---|---|
| | CONFIGURATION INFORMATION | | | |
| 1 | SPECIFIC INFORMATION | | PROGRAM NAME | PRG1 |
| 2 | | | TYPE NAME | S-1291-2 |
| 3 | | | VERSION NO | 01-00 |
| 4 | | | APPLICATION FIELD | AUTOMATIC OPERATION |
| | | | --- | |
| 5 | CONNECTION INFORMATION | | NAME OF CENTRAL PROCESSING UNIT | CPU1 |
| 6 | | | NAME OF JOB | JPRG1 |
| 7 | | | NAME OF GENERAL CONTACT CLOSING UPON ACCIDENT | SW1 |
| | | | --- | |
| | EVENT INFORMATION | | | |
| 8 | STATE INFORMATION | | PRESENCE/ABSENCE OF ACCIDENT | NORMAL/ABNORMAL |
| | | | --- | |

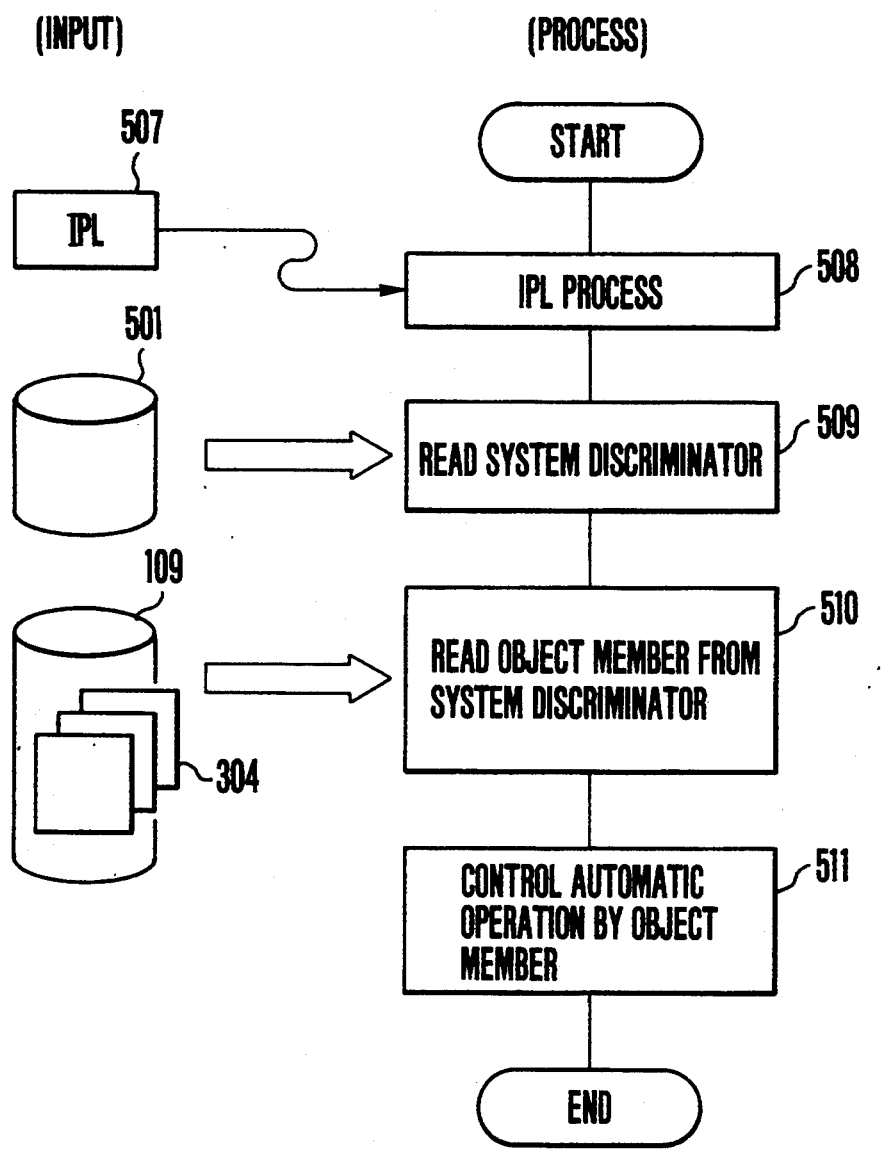

FIG.5C

| EVENT OCCURRENCE TIME | EVENT TIME CODE | EVENT NAME |
|---|---|---|
| 10:30.02 | | IPL |
| 10:31.28 | | MSG0011 |
| ⋮ | ⋮ | ⋮ |
| 12:10.34 | | ABC |
| ⋮ | ⋮ | ⋮ |

FIG.6

| ITEM | CLASSIFICATION | CONTENTS OF EVENT | COMMAND EXAMPLE |
|---|---|---|---|
| 1 | START OF COMPUTER SYSTEM | IPL COMPLETION OF EACH COMPUTER SYSTEM START COMPLETION OF EACH SOFTWARE CONFIGURATION ELEMENT | DISPLAY ON DISPLAY COMMAND TERMINAL |
| 2 | MONITOR OF USE STATE OF SYSTEM RESOURCES | USE RATE OF EACH STORAGE AREA USE RATE OF EACH BUFFER | ALARM AT UPPER/LOWER LIMIT VALVE OR CANCEL JOB, IN CASE OF SPECIFIC JOB DISPLAY ON DISPLAY COMMAND TERMINAL |
| 3 | MONITOR OF PERFORMANCE | USE RATE OF CPU RESPONSE TIME OF TSS | ALARM AT UPPER/LOWER LIMIT VALVE OR CANCEL JOB, JVDGE ACARM CONTENTS ALARM OR DYNAMIC CHANGE OF SYSTEM |
| 4 | ABNORMAL CONDITIONS OF COMPUTER SYSTEM | ABNORMAL INUT/OUTPUT DEVICE ABNORMAL EACH SOFTWARE CONFIGURATION ELEMENT | JVDGE ACARM CONTENTS, ACARM OR DYNAMIC CHANGE OF SYSTEM |
| 5 | STOP OF COMPUTER SYSTEM | STOP OF EACH SOFTWARE CONFIGURATION ECEMENT STOP OF EACH COMPUTER SYSTEM | DISPLAY ON DISPLAY COMMAND TERMINAL |

FIG. 7
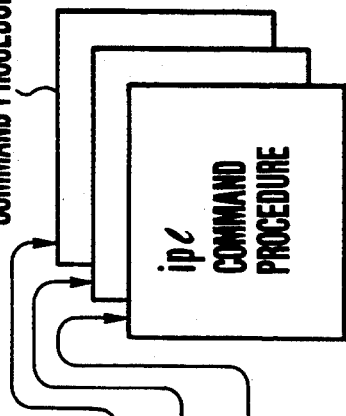
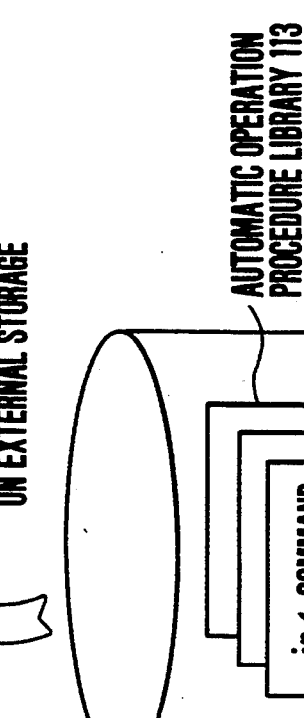

FIG. 8B

| ROW NO. | CONTENTS OF COMMAND PROCEDURE |
|---|---|
| 1 | OCPU: PROC; |
| 2 | WRITESDB (CPUREUORD, EXCESS OF USERATE) |
| 3 | ACTION (INHIBITION OF JOB INPUT) |
| 4 | READSDB (HISTORY INFORMATION, EVENT NAME=OCPU, EVENT DISCRIMINATOR CODE=1, WITHIN 5 MINUTES) |
| 5 | IF OCPU OCCURRED WITHIN 5 MINUTES BEFORE EVENT OCCURRENCE, THEN |
| 6 | DO; |
| 7 | OPERATOR (OCPO ALARM MESSAGE) |
| 8 | END; |
| 9 | ELSE; |
| 10 | A: |
| 11 | WAIT IF JOB COMPLETION, OR USERATE OF CPU UNDER LOWER LIMIT VALUE |
| 12 | IF JOB COMPLETION, THEN |
| 13 | DO; |
| 14 | ACTION (STOP JOB EXECUTION CONTROL PROGRAM) |
| 15 | WRITESDB (EXECUTION CONTROL PROGRAM RECORD, EXECUTION STOP) |
| 16 | GOTO A; |
| 17 | END; |
| 18 | ELSE; |
| 19 | ACTION (START STOPPED EXECUTION CONTROL PROGRAM) |
| 20 | WRITESDB (EXECUTION CONTROL PROGRAM RECORD, EXECUTION START) |
| 21 | ACTION (RESUME JOB INPUT) |
| 22 | END OCPU; |

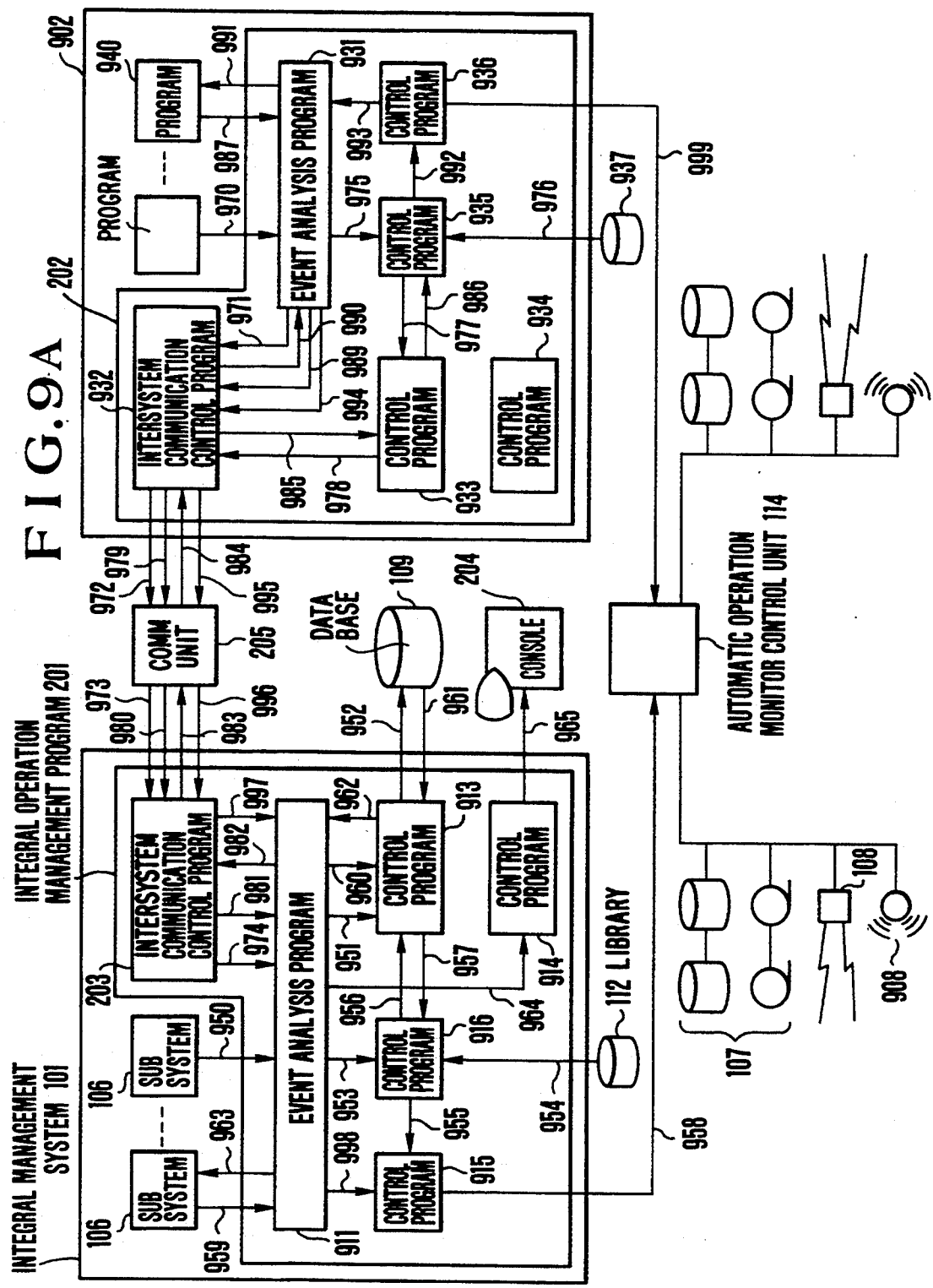

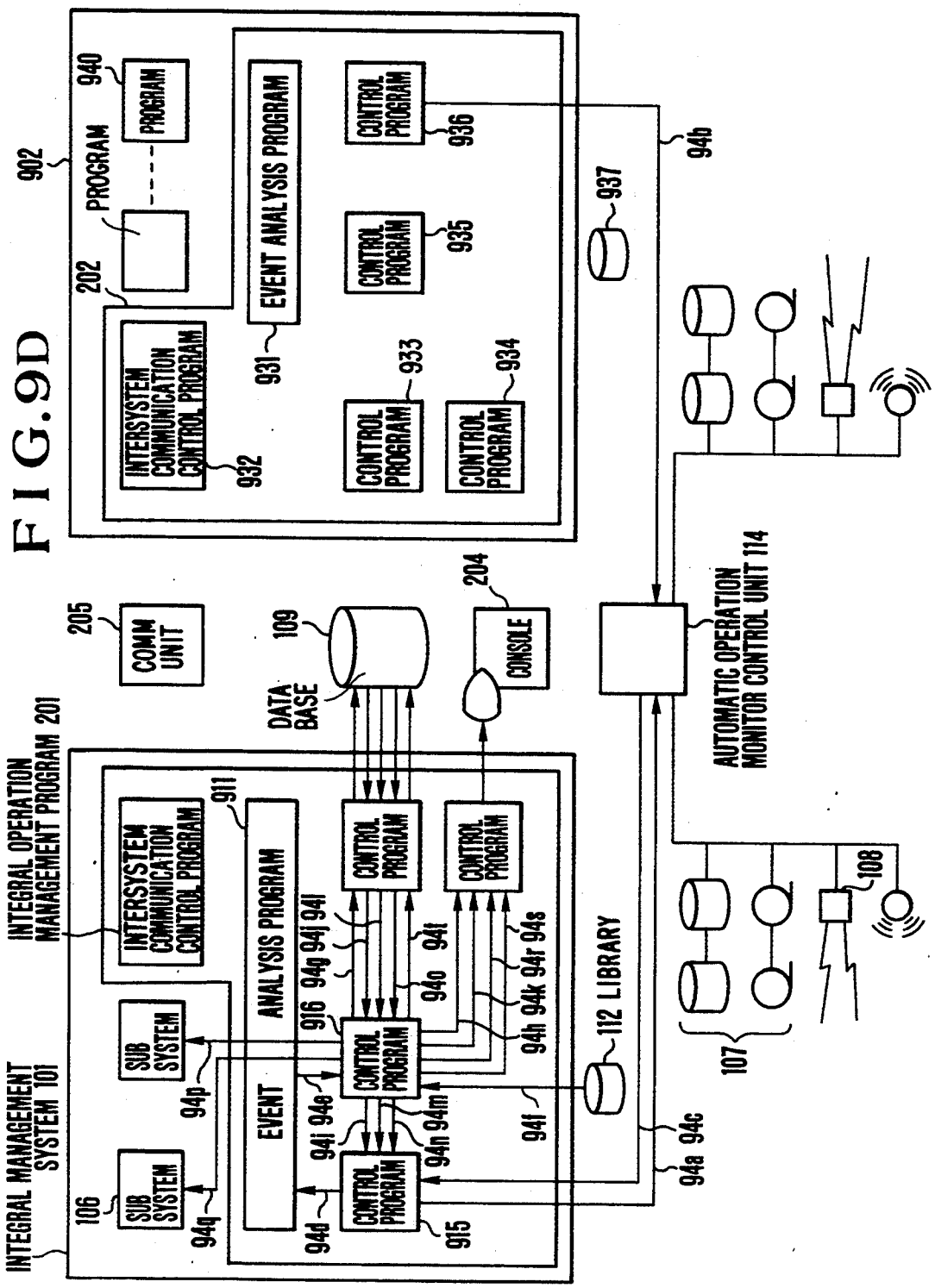

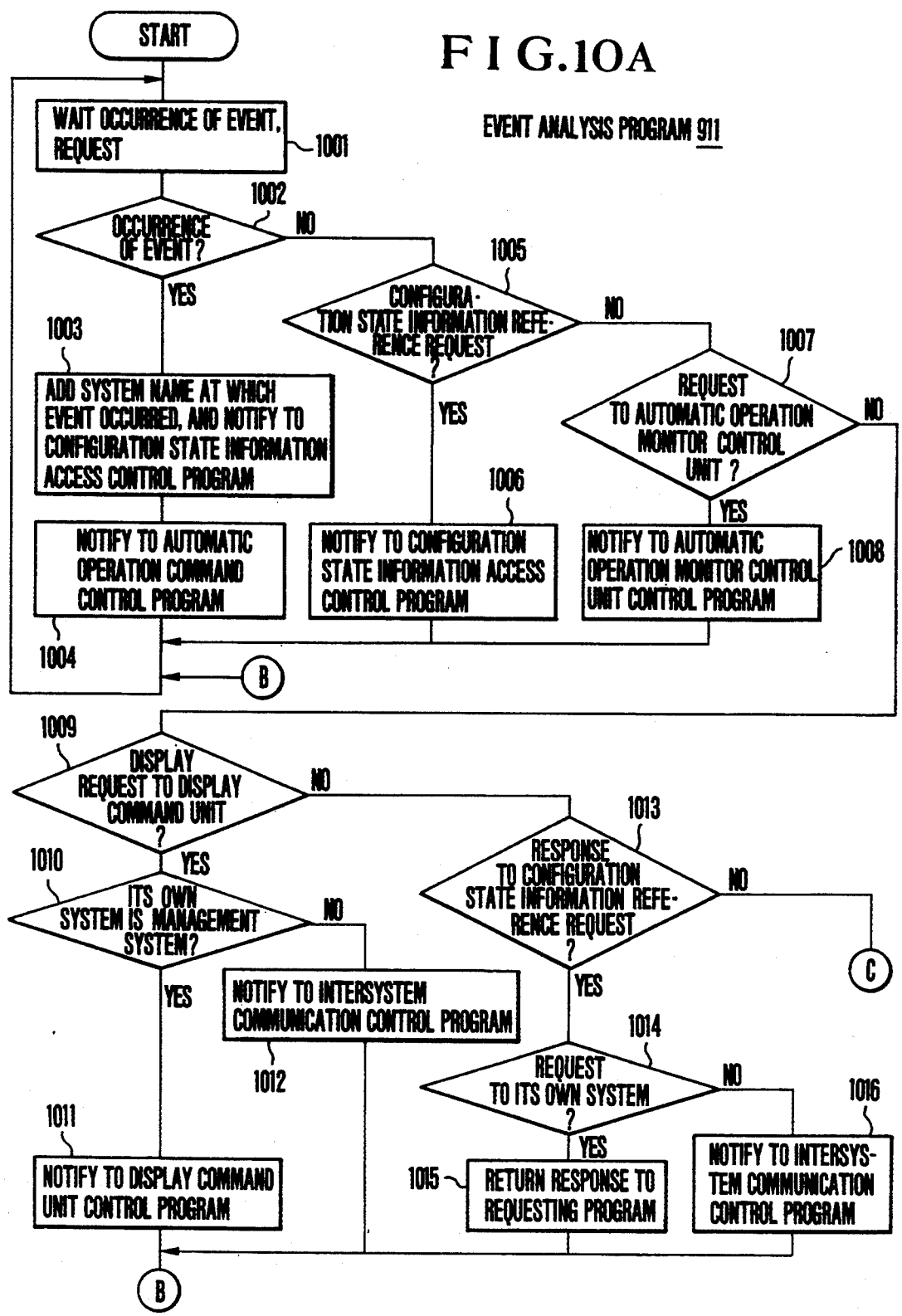

OPERATION CONTROL TECHNIQUE FOR COMPUTER SYSTEM BY DRIVING A COMMAND PROCEDURE WITH REFERENCE TO EVENTS RECORDED ON A LOGGING STORAGE COMPUTER OPERATION CONTROL BY AUTOMATIC DECISION MAKING BASED ON EVENTS ON A LOGGING STORAGE

This application is a continuation of application Ser. No. 07/411,894, filed on Sep. 25, 1989, now abandoned.

BACKGROUND OF THE INVENTION

The present invention relates to an automatic operation control system for a computer system, and more particularly to an automatic operation control system for controlling the operation of a computer system by automatically generating an operation command most suitable for various events generated while running the computer system, such as an event of change in the program running conditions, an event on a use state of resources, and the like.

Information processing systems or computer systems are nowadays in service all day long, and it is difficult to procure operators for the systems. In view of this, there has been disclosed, in order to provide for manless operation of a computer system, a control system for mutually monitoring computer systems constituting a network, as described, e.g., in Japanese Patent Laid-open Publication JP-B-61-6426. According to the control system described in JP-B-61-6426, in the computer systems constituting a network, a start or stop command for a computer system is sent by using a public telephone line while monitoring an accident monitor console, and after the start of the computer systems, data transmission lines dedicated to the computer systems are used for both general data transmission and monitor data transmission, to thereby aim at reducing the operator man power for the systems of the network and reducing the telephone line toll.

As an automatic operation control method which supports manless computer systems, there is disclosed in Japanese Patent Laid-open Publication JP-A-62-182822 a control method wherein two sets of the same operation schedule file are provided in order to change operation schedules without stopping the computer systems.

According to JP-A-62-182822, a computer system in a network is caused to state in response to another computer system via a public telephone line, and dedicated data transmission lines are used for the transmission/reception of monitor data, to thereby aim at reducing the operator man power and the telephone line toll. Although this publication discloses a method of sending and receiving a command signal for starting a computer system, it does not disclose up to a start procedure for a computer system, a control procedure for manless operation of the computer system after it is started, and a control procedure for dealing with a computer system accident.

In the control system described in JP-A-62-182822, two sets of the same schedule file are provided, the schedule file being composed of a schedule table for job execution and a job procedure. While one schedule file is used, the contents of the other schedule file are updated. Upon input of a switch command, a job execution schedule is performed in accordance with the updated contents of the other schedule file, thereby preventing an interception of automatic operation which otherwise occurs as a result of a change in job execution schedule. The control system described in JP-A-62-182822 is designed to perform an automatic operation by designating the execution start time of each job and executing the job at the designated time. The disclosed technique is concerned with a method of scheduling a job at a designated time. From the standpoint of computer system automatic operation, however, it is seen that the load conditions of the whole system are not still taken into consideration. It is important from the standpoint of computer system automatic operation to reduce the operator man power and perform a proper load operation of a computer system.

From this point of view, the control method according to JP-B-61-6426 also does not teach what type of a control procedure initializes the Operating System (OS) after a command signal for starting a computer system is received, fetching the monitor data of the computer system, the type of computer system, and the like.

Empirical knowledge of an operator is required more and more as the styles of using computer systems more versatile and complicated, such as the composite configuration of plural computer systems, various connections to input/output devices, a combination of batch processing jobs and on-line processing jobs, and the like. Further, in order to realize automatic operation of computer systems, there are some problems to be solved, namely in connection with an event not dealing with operator empirical knowledge, such as a change in computer system configuration, automatic control of an OS control procedure for proper load operation, and the like.

SUMMARY OF THE INVENTION

It is an object of the present invention to provide an automatic operation control system wherein an operation event of an operating system and application programs, an event on the state of use of computer system resources, and an operation event of computer system hardware, are stored each time such an event occurs to thereby realize automatic computer system operation, and the computer system is operated properly in accordance with the current and past operation conditions of the computer system.

It is another object of the present invention to provide an automatic operation control system for a composite computer system (plural computer systems) configuration using a plurality of computer systems, wherein an operation command most suitable for an event which has occurred at each computer system is generated, and the computer system which collectively supervises the operations of respective computer systems, carries out an optimum operation of the composite computer system on the basis of an occurred event.

It is a further object of the present invention to provide a control system allowing an optimum configuration change and dynamic power on/off control by collectively managing the connection/operation state of a central processing unit and input/output devices constituting a computer system.

It is a still further object of the present invention to provide a control system allowing an optimum local operation in the whole computer system by transferring an event which has occurred within the computer system to other sub-programs and general application programs of the operating system.

It is another object of the present invention to provide a control system capable of dealing with a change in system scale by making it possible to register or change the generation order of operation commands when an operation command most suitable for an event which has occurred within the computer system is generated.

It is a further object of the present invention to provide a control system for a composite computer system configuration, wherein, when the operation of the computer system which supervises and manages the whole system is stopped, another computer system can automatically supervise and manage the whole computer system.

In order to achieve the above objects, there is provided first storage means for storing the configuration of hardware and software of the computer system or composite computer system, and the operation events including a running event of the operating system and application programs, and an operation even of the computer system itself, and there is further provided a command procedure for giving a command in accordance with the configuration and events, to thereby control the automatic operation of the whole system.

Upon occurrence of an operation event, the information stored in the first storage means is referred to in accordance with the control procedure to automatically send a command to the computer system at which the event occurred. The computer system or composite computer system can thus be automatically operated.

There are provided second storage means for storing the interconnection/operation state of hardware in a computer system or composite computer system and the power on/off state of hardware, and a control unit for controlling the power on/off of hardware and switching of the interconnections, wherein the method of sending a command to the control unit, and the method of carrying out this command sending method in accordance with the command procedure, are given to thereby automatically control the power on/off operation of hardware and switch the interconnections.

In the automatic operation control system for a computer system according to the present invention, the process procedures are sequentially executed for each event which has occurred in the computer system, to thereby effect control to generate an optimum operation command for automatic operation.

In addition, accidents and configuration changes can be automatically dealt with so that manless operation in a real sense of this term can be realized.

BRIEF DESCRIPTION OF THE DRAWINGS

FIG. 4A is a table showing the contents of records of an input/output device;

FIG. 4B is a table showing the contents of records of a program configuration running state;

FIG. 5B shows a process flow for starting the operation in accordance with the configuration state information storage data base;

FIG. 5C shows an event occurrence information table of the configuration state information storage data base;

FIG. 6 is a table showing items of system operation events and the examples of commands to be executed for thee events;

FIG. 7 shows an operation event definition table and the automatic operation command procedure;

FIG. 8B is a table showing an example of the automatic operation command procedure;

FIG. 9A is a block diagram showing the relationship between contitutional elements of the present invention;

FIG. 9D illustrate an example of automatic dynamic switching to the on-line system frequently used in an on-line system; and FIGS. 10A to 15 are flow charts illustrating the process procedure of an integral operation management program, wherein:

FIGS. 10A and 10B are flow charts illustrating the process procedure of an event analysis program;

FIG. 11 is a flow chart illustrating the process procedure of an intersystem communication program;

FIG. 12 is a flow chart illustrating the process procedure of a configuration state information access control program;

FIG. 13 is a flow chart illustrating the process procedure of a display command unit control program;

FIG. 14 is a flow chart illustrating the process procedure of an automatic operation monitor control unit control program; and FIG. 15 is a flow chart illustrating the process procedure of an automatic operation command processing program.

DESCRIPTION OF THE PREFERRED EMBODIMENTS

The preferred embodiments of the present invention will be described in detail with reference to the accompanying drawings.

Figure 1:
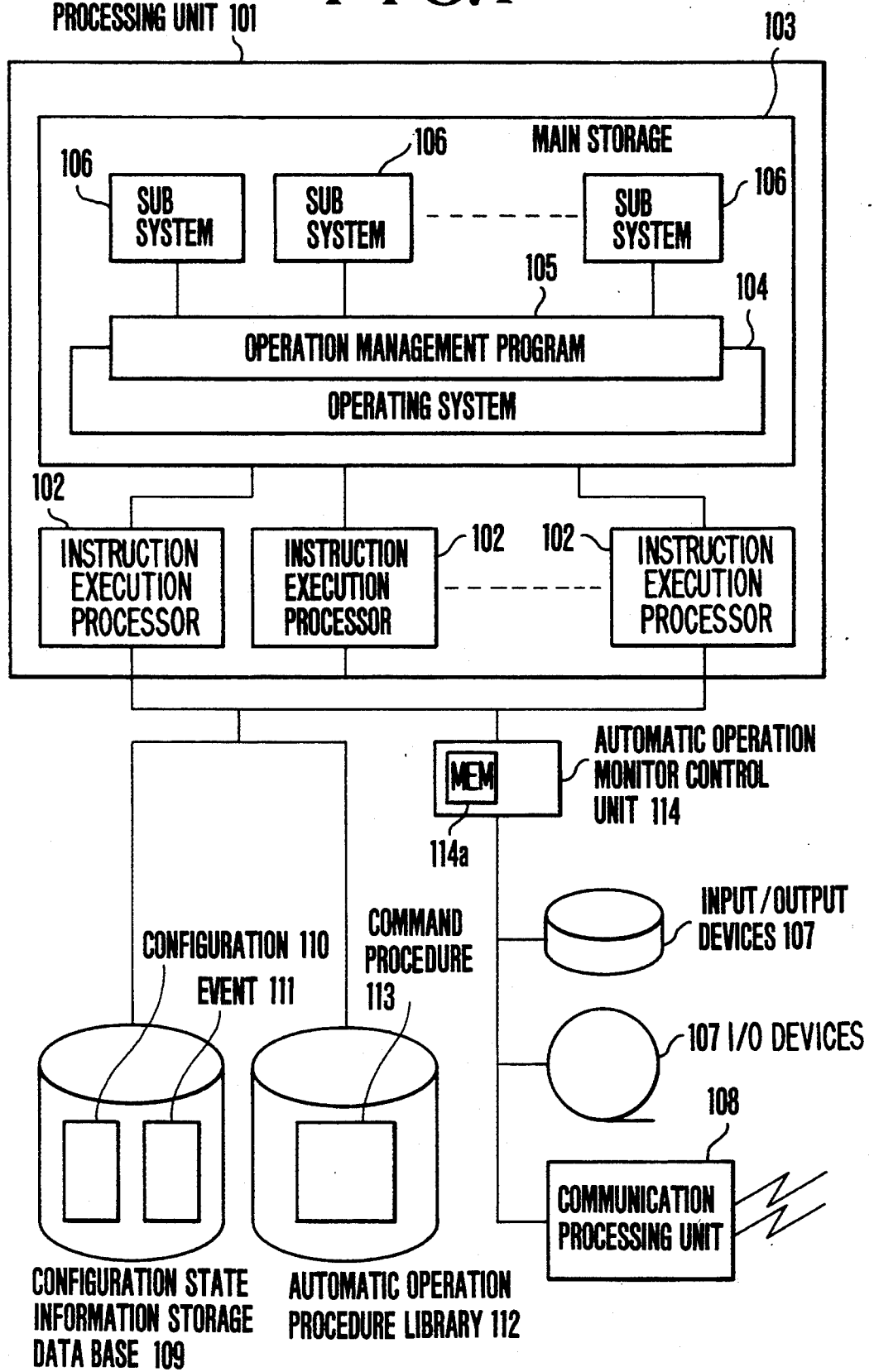
FIG. 1 is a block diagram showing an embodiment of a system configuration according to the present invention.
Figure 2:
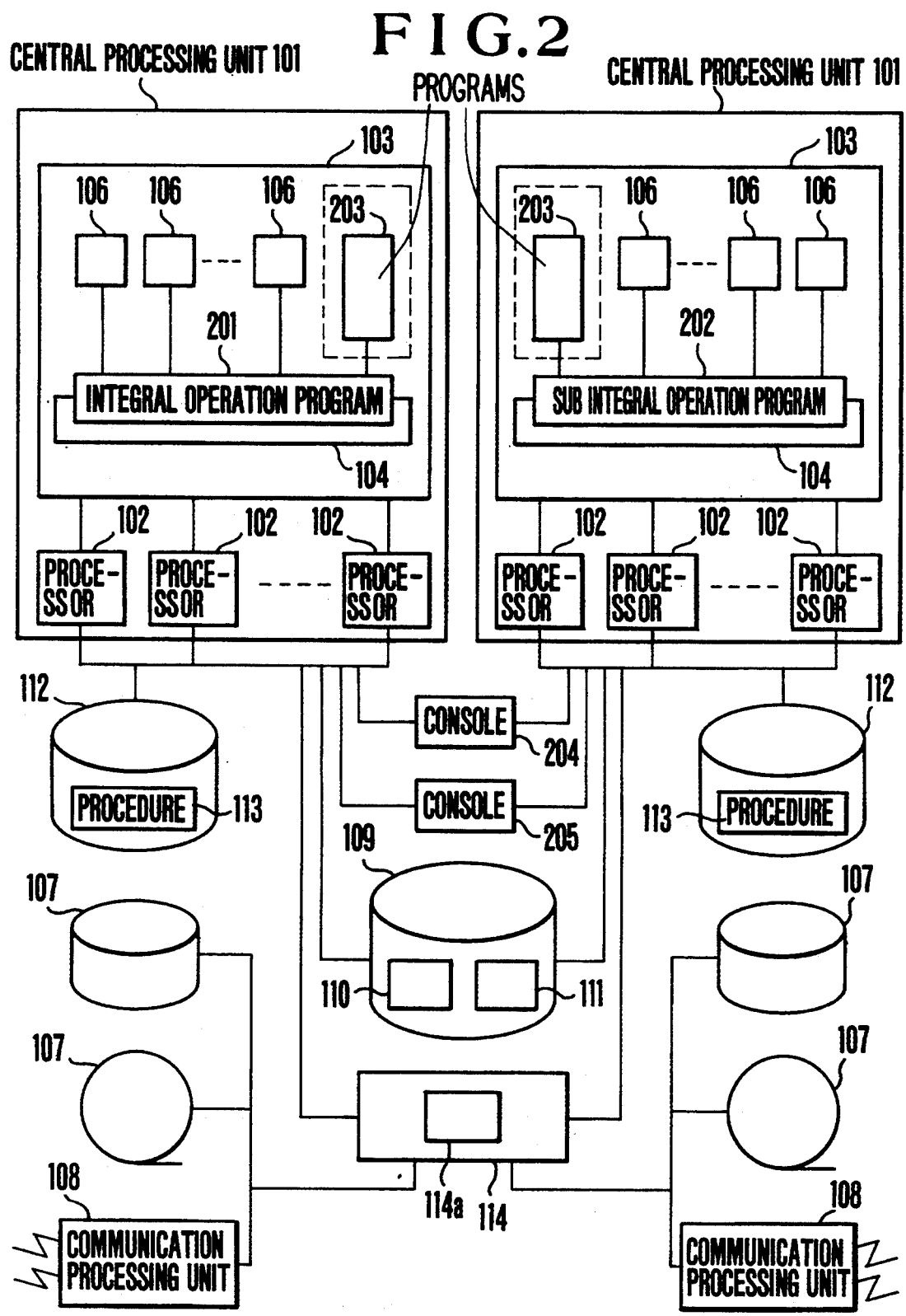
FIG. 2 is a block diagram showing the system configuration for a composite computer system (plural computer systems) having a plurality of computer systems.

FIGS. 1 and 2 are block diagrams showing the embodiments of the configuration of a computer system according to the present invention, wherein FIG. 1 shows a single computer system and FIG. 2 shows a composite computer system.

FIG. 1 shows the system configuration and hardware arrangement embodying the present invention. A central processing unit 101 is constructed of instruction execution processors 102 and a main storage unit 103 which can be accessed and updated by the instruction execution processors 102. As shown in FIG. 1, the system can be constructed of a plurality of instruction execution processors 102. Reference numeral 104 represents an operating system for controlling the system, and 105 an operation management program. Reference numeral 106 represents a sub-system, such as application programs, communication management programs and the like, which are monitored and controlled by the operation management program 105. Reference numeral 107 represents an input/output device group, such as magnetic disks and tapes constituting the computer system, and 108 represents a communication processing unit.

Reference numeral 109 represents a configuration state information storage data base serving as a constitutional element of the present invention. The configuration state information storage data base 109 is constructed of a configuration state information table 110 and an event occurrence information table 111. The configuration state information table 110 stores therein the configuration of hardware of the computer system and the software configuration information of the operating system and application programs. The event occurrence information table 111 stores therein the information on a running event of the operating system and application programs running on the system, an event on the use state of system resources, and an event on the system operation. Reference numeral 112 represents an automatic operation command procedure library which stores an automatic operation command procedure 113 for designating an operation type suitable for an event which has occurred in the system. Reference numeral 114 represents an automatic operation monitor control unit, which is a service processor for controlling the power on/off, or means for controlling the power on/off and for switching the interconnection of the input/output devices including the communication processing unit. The control unit 114 has a memory 114afor storing the interconnection, operation, and power on/off states of the units and devices constituting the computer system.

FIG. 2 shows the system configuration of a composite computer system having a plurality of computer systems. Elements similar to those shown in FIG. 1 are represented by identical reference numbers. An integral operation management program 201 integrally controls the operation of a plurality of computer systems. A sub integral operation management program 202 controls the operation of its own system, and integrally controls the operation of a plurality of computer systems by serving as a substitute for the integral operation management program 201 when the latter program runs down. The integral operation management program 201 and sub integral operation management program 202 constitute the elements of the present invention as applied to a composite computer system. FIG. 2 shows an example of the composite computer system having two computer systems. The number of computer systems is not limited. If three or more computer systems are used, an additional sub integral operation management program 202 runs under the respective computer systems. An intersystem communication unit 205 is used for the communication between computer systems in the composite computer system. The intersystem communication unit 205 is supervised by an intersystem communication control program 203 in the integral operation management program 201. An integral operation console 204 is used for integrally displaying the operation state of the composite computer system and integrally generating a command to the system. The configuration state information storage data base 109 is connected at least to the computer system under which the integral operation management program 201 runs or to the computer system under which the sub integral operation management program 202 runs, and can be accessed by the program. In the composite computer system, each computer system is provided with an automatic operation command procedure library 112 which stores therein the automatic operation command procedure 113 for dealing with an event occurred within its own system. The automatic operation command library 112 also stores the command procedure for synchronously supplying a command to a plurality of computer systems.

FIGS. 3A to 5C show the detailed illustration of the contents of the configuration state information table 110 and event occurrence information table 111 shown in FIGS. 1 and 2, and of the method of using the tables.

Figure 3A:
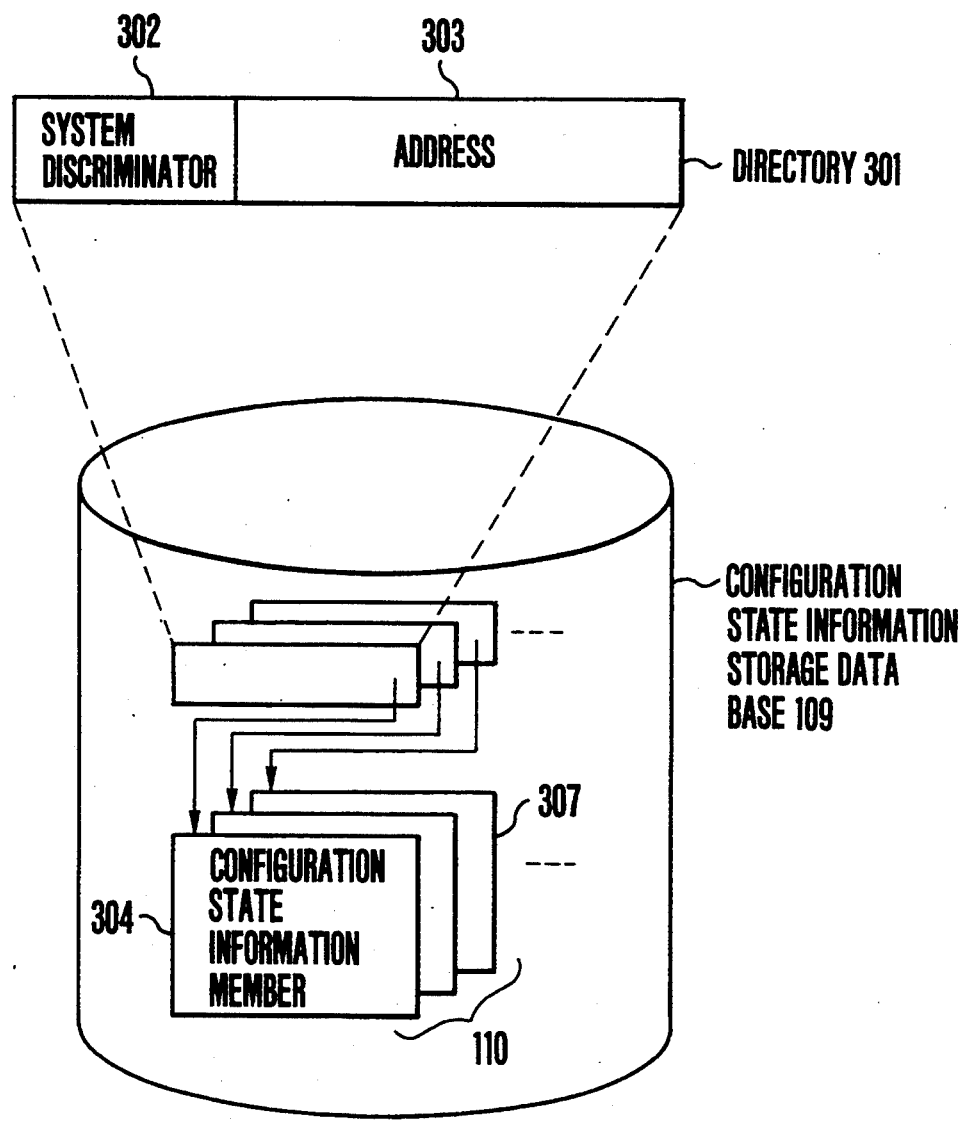
FIG. 3 is a diagram showing the information storage structure of a configuration state information storage data base.
FIG. 3B is a table showing the types of information records stored in the configuration state information storage data base.

FIG. 3A shows the structure of the configuration state information storage data base 109. In FIG. 3A, the configuration state information table 110 is constructed of a plurality of members 304 to 307 provided for each system configuration to deal with a change in system configuration. Each member 304 to 307 corresponds to each computer system. In the example shown in FIG. 2, there are two computer systems so that the table has two members. Each member is managed by a directory 301. The directory 301 has a system discriminator 302 for discriminating between members, and a storage address 303 of the configuration state information member 304 corresponding to the system discriminator 302 and stored in the data base 109.

FIG. 3B shows an example of types of information records stored in each member 304 to 307 of the configuration state information table 110 in the configuration state information storage data base 109. Item No. 1 is an automatic operation monitor control unit record for storing the information on the automatic operation monitor control unit 114, and item No. 2 is a CPU record for storing the information on the central processing unit 101. Item No. 3 is an input/output control unit record for storing the information on the input/output control unit, item No. 4 is an input/output unit record for storing the information on the input/output device connected to a computer system. Item No. 5 is a general contact record for storing the information on a general contact of the automatic operation monitor control unit 114, and item No. 6 is an SVP (Service Processor) record for storing the information on a SVP. Item No. 7 is a console record for storing the information on the operator console, and item No. 8 is a power on/off record for storing the power information of respective devices. Item No. 9 is a change control record for storing the change control information on a system configuration, and item No. 10 is a system start control record for storing the system start control information. Item No. 11 is a program configuration running state record for storing the information on program running within a computer system, and item No. N is a group control record for storing the information on the group composed of a plurality of central processing units, programs and jobs. As described above by way of example, various events which have occurred within a computer system and configuration information are stored. By reading these records, it is possible to know the system configuration and state.

FIG. 4A shows an example of the contents of the input/output device record at item No. 4 of the information record 110 shown in FIG. 3B. Item No. 1 is a logical device symbol name (e.g., KO1) of the input-/output device among the specific information of the record, item No. 2 is a device address (e.g., 101) of the input/output device among the specific information of the record, item No. 3 is a device type of the input/output device among the specific information of the record, and item No. 4 is an application (e.g., on-line journal) of the input/output device among the specific information of the record. Item No. 5 is an input/output control unit name which unit is connected to the input-/output device, among the connection information, and item No. 6 is a general contact name which contact is closed when the input/output device is defective, among the connection information. The configuration state information table 110 contains event information. Among the event information, item No. 7 is the information on whether the input/output device can be used or not, and item No. 8 is the information on the presence/absence of the input/output device among the event information. This input/output device record reflects the state of the input/output device.

FIG. 4B shows an example of the contents of the program configuration running state record at item No. 11 of the information record 110 shown in FIG. 3B. Item No. 1 is a program name (e.g., PRG1) among the specific information on the record, item No. 2 is the type of the program among the specific information of the record, item No. 3 is a version number of the program among the specific information of the record, item No. 4 is an application field of the program among the specific information of the record, item No. 5 is a central processing unit name under which the program runs, among the specific information of the record, item No. 6 is a job name for which job the program runs, among the specific connection information of the record, and item No. 7 is a general contact name which contact is closed when the program is defective, among the connection information of the record. Item No. 8 is the event information indicating the presence/absence of any failure of the program among the state information.

Figure 5A:
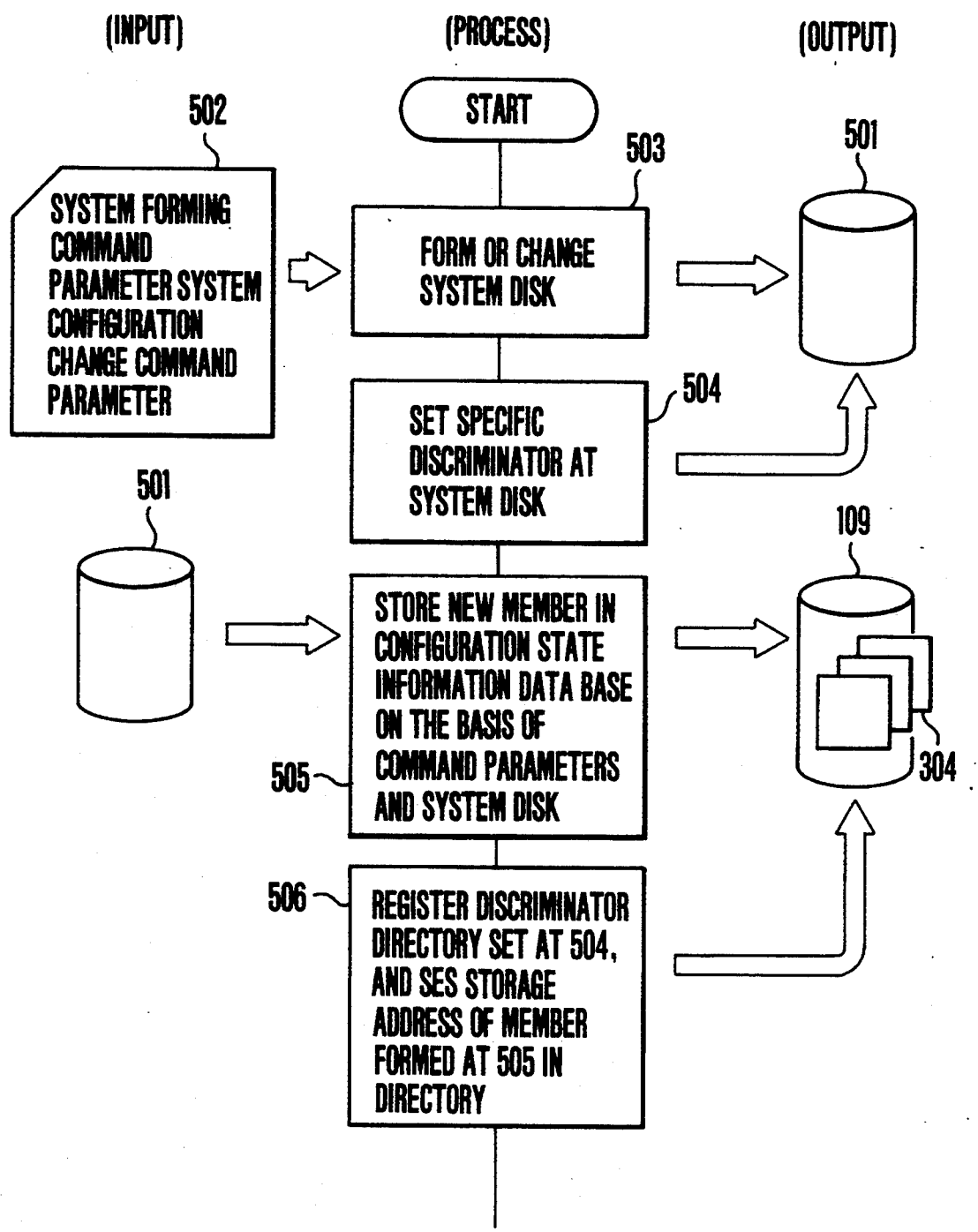
FIG. 5A shows a process flow for registering a configuration running state information member in the configuration state information data base.

FIG. 5A shows the process procedure of registering a proper configuration state information member 304 in the configuration state information data base 109 described with reference to FIG. 3A, when a system is configured or a system configuration is changed because of system scale enlargement or the like. In FIG. 5A, system configuring instruction parameters or system configuration change parameters 502 made by a user are inputted to form or change a system disk 501 (step 503). In order to reflect the change information upon the configuration state information storage data base 109, the system discriminator is set at the system disk 501 (step 504). Using instruction parameters of the parameters 502 and the system disk 501, the configuration state information member 304 is newly formed and stored in the configuration state information storage data base 109 (step 505). The directory 301 having the system discriminator set at step 504 is registered, and the storage address 303 at the data base 109 of the member formed at step 505 is registered in the directory 301 (step 506).

FIG. 5B shows the process procedure of starting operation in accordance with the system disk 501 and the configuration state information storage data base 109 both formed and registered as shown in FIG. 5A. Upon an initial program load (507, hereinafter called IPL) from an operator or the automatic operation monitor control unit 114, an IPL process is executed (step 508). The system discriminator is read from the system disk 501 (step 509). Based on the system discriminator (302 in FIG. 3A), the configuration state information member 304 corresponding to the discriminator can be recognized from the configuration state information storage data base 109 so that the member is read (step 510). Since the read member 304 stores the system start control record shown in FIG. 3B, an automatic operation control can start in accordance with the read member (step 511).

As described with reference to FIGS. 3A to 5B, only by forming system configuring parameters or system configuration change parameters as conventional, it becomes possible to carry out an automatic operation in accordance with the configuration state information member for the new system configuration.

FIG. 5C illustrates the contents of the event occurrence table 111 of the configuration state storage data base 109. The event occurrence information table 111 stores the occurrence times, event type codes representative of the types of events, and event names, in the order of occurrence. By searching this table 111, it is possible to know the time and type of an event which has occurred within the system. The event information can be used as judgement information for automatic operation.

FIG. 6 shows typical examples of items of system operation event information, and the corresponding commands issued upon occurrence of such operation events. Item No. 1 is for a start of a computer system, item No. 2 is for a use state of system resources, item No. 3 is for the performance of a computer system, item No. 4 is for an abnormal state of a computer system, and item No. 5 is for a stop of a computer system. Proper commands to be generated upon occurrence of these events are defined so as to carry out automatic operation.

Figure 8A:
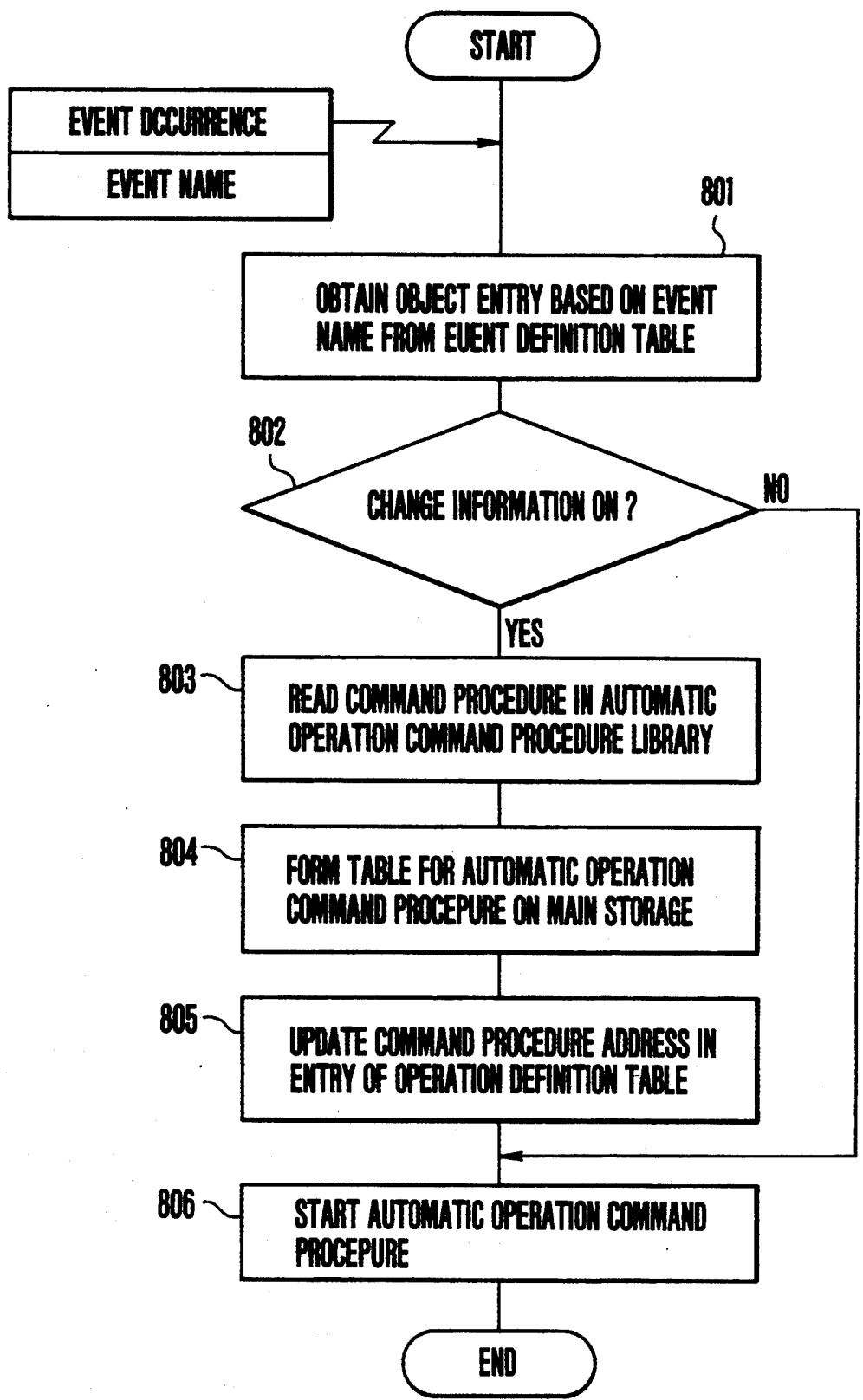
FIG. 8A is a flow chart showing the procedure carried out by the automatic operation control system.
Figure 8C:
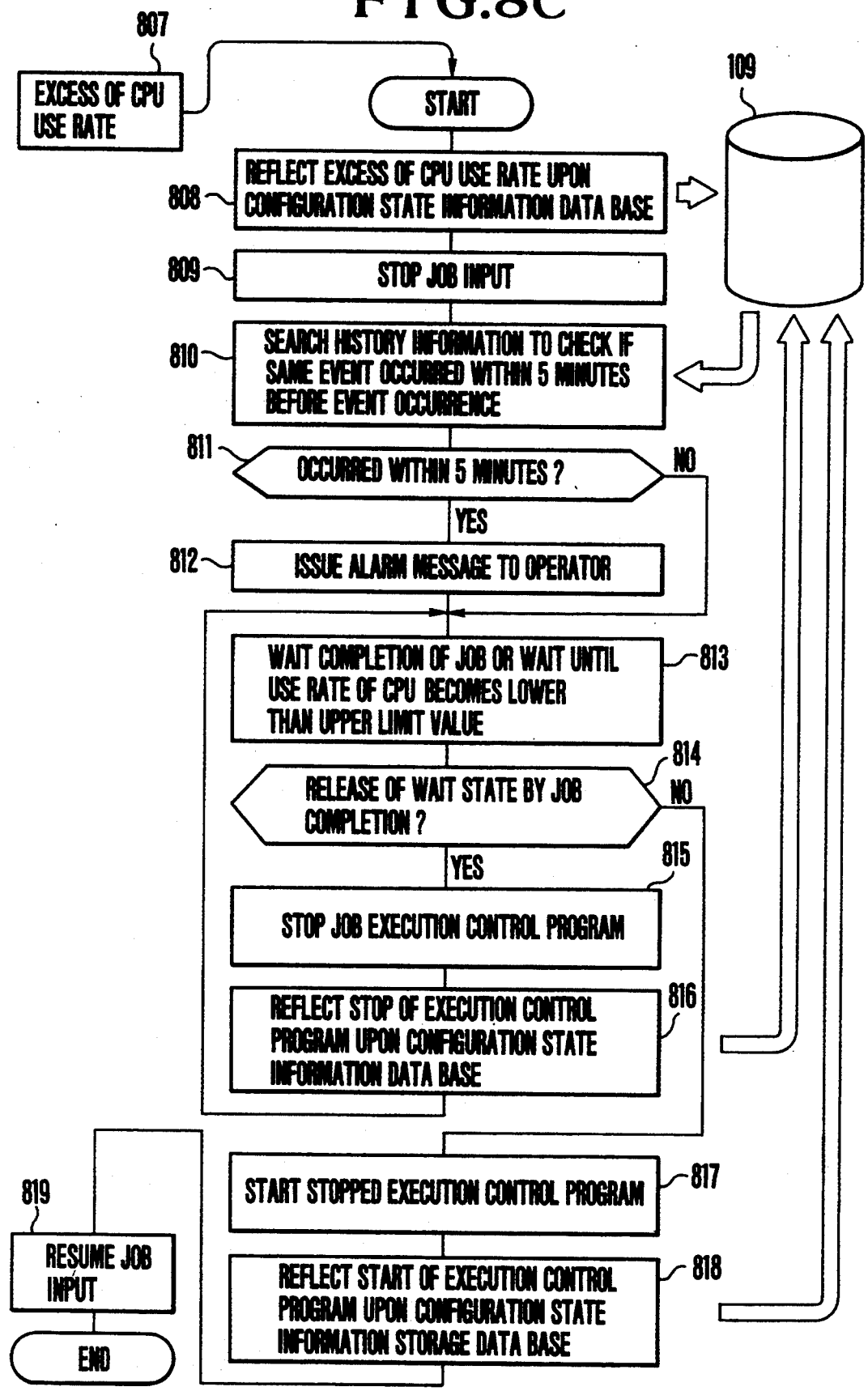
FIG. 8C shows a process flow of the procedure shown in FIG. 8B.

The particular examples are shown in FIGS. 7 to 8C. FIG. 7 shows an operation event definition table 701 stored in the main storage, and the corresponding command procedures for respective events. FIG. 7 details the automatic operation command procedure 113 shown in FIGS. 1 and 2. In FIG. 7, the operation event definition table 701 is composed of, for each event, an automatic operation command procedure name, a change information indicating if there is a change in the contents of the automatic operation command procedure, and an address or command procedure address of the main storage at which the contents of the automatic operation command procedure are stored. As seen also from FIG. 7, a copy of the automatic operation command procedure 113 in the external storage is stored as the automatic operation command procedure 702 in the main storage.

FIG. 8A illustrates the process procedure for the automatic operation control system, which procedure is carried out upon occurrence of an event in accordance with the operation event definition table 701 and automatic operation command procedure 702 in the main storage. This process procedure is a part of the processes by the operation management program 105 shown in FIG. 1. Upon occurrence of an event having a certain event name, the entry having the same event name is accessed in the operation event definition table 701 in the main storage (step 801). In order to check if the automatic operation command procedure at the accessed entry was changed or not, it is checked if the change information at the accessed entry is ON or OFF (step 802). If ON, it means that there was a change, so that the automatic operation command procedure 113 in the automatic operation command library 112 is read (step 803). A table for the automatic operation command procedure is formed in the main storage (step 804), the command procedure address in the operation event definition table 701 at the entry is updated, and the change information is turned to OFF (step 805). If OFF at step 802, or after the process at step 805, the corresponding automatic operation command procedure 702 is activated (step 806).

FIG. 8B shows an example of the automatic operation command procedure 702 used when the use rate of the central processing unit exceeds a predetermined upper limit value, and FIG. 8C illustrates the processes by the operation management program 105 corresponding to the automatic operation command procedure 702.

The processes of the automatic operation command procedure will be described with reference to FIGS. 8B and 8C. When the operation management program 105 receives an event (event name OCPU shown in FIG. 7) indicating that the use rate of the central processing unit exceeds a predetermined upper limit value, the address (address 1) of the automatic operation command procedure (ocpu) is obtained from the operation event definition table 701 to thereafter start the automatic operation command procedure shown in FIG. 8B (step 807). Row No. 1 in FIG. 8B shows the start of the automatic operation command procedure (ocpu). At row No. 2, the event that the use rate of the central processing unit exceeds the upper limit value is reflected upon the CPU record in the configuration state information definition table 110 (step 808). At row No. 3, a command to stop inputting a job is entered so as not to increase the load because of the capacity limit of the central processing unit (step 809). At row No. 4, an occurrence frequency of the event is checked in such a manner that the event occurrence information table 111 is searched to check if the same event occurred during the past five minutes (step 810). It is judged at row No. 5 if the same event occurred within the past five minutes (step 811). If an affirmative judgement is obtained at step 811, the processes at row Nos. 6 to 8 are performed. Row No. 6 is the start of the processes in the case of the affirmative judgement at step 811. At row No. 7, an alarm message is issued to the effect that an overload of the central processing unit has frequently occurred. Row No. 8 is the end of the processes in the case of the affirmative judgement at step 811. If a negative judgement is obtained at step 811, the procedure enters into row No. 9 at which no process is carried out, and proceeds to row No. 10 which is an execution order control label name. At row No. 11, the procedure stands by until the presently executed job terminates or until the use rate of the central processing unit goes down below the upper limit value (step 813). After the stand-by state at row No. 12, it is judged if the release of the stand-by state has been caused by the job termination or not (step 814). If an affirmative judgement is obtained at step 814, row Nos. 13 to 17 are executed. Row No. 13 is the start of the processes in the case of the affirmative judgement at step 814. In order to prevent executing the now standing-by job, a stop command is entered to stop the execution control program of the job (step 815). At row No. 15, the stopping of the execution control program is reflected upon the program configuration running state record (FIG. 4B) of this execution control program in the configuration state information data base 109 (step 816). The procedure returns from row No. 16 to row No. 10 to the wait row No. 11. Row No. 17 is an end of the processes in the affirmative judgements is obtained at step 814. If a negative judgement at step 814, the procedure enters into row No. 18 which has no process so that the procedure advances to row No. 19. At row No. 19, since the use rate of the central processing unit goes lower than the upper limit value, a start command is entered to resume the job execution control program stopped at step 815 (step 817). Next, at row No. 20 the start of the execution control program is reflected upon the program configuration running state record of the execution control program in the configuration state information storage data base 109 (step 818). At row No. 21, a command is entered to resume the job input (step 819). Row No. 22 is an end of the automatic operation command procedure. In the above manner, a proper operation control is carried out for the over-load state of the central processing unit.

Figure 8D:
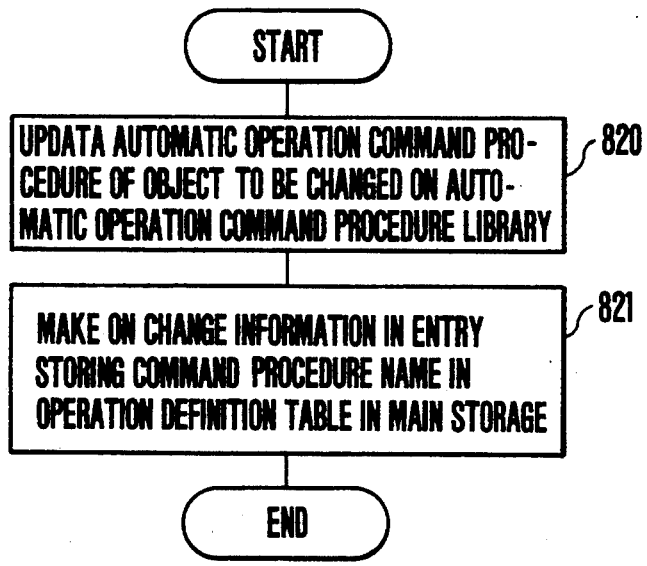
FIG. 8D is a process flow showing the procedure of changing the automatic operation command procedure library.

The method of changing the automatic operation command procedure of the automatic operation command library 113 during the system operation, and making valid the change without restarting the operation management program, according to the present invention, will be described with reference to FIGS. 8D and 8E.

Figure 8E:
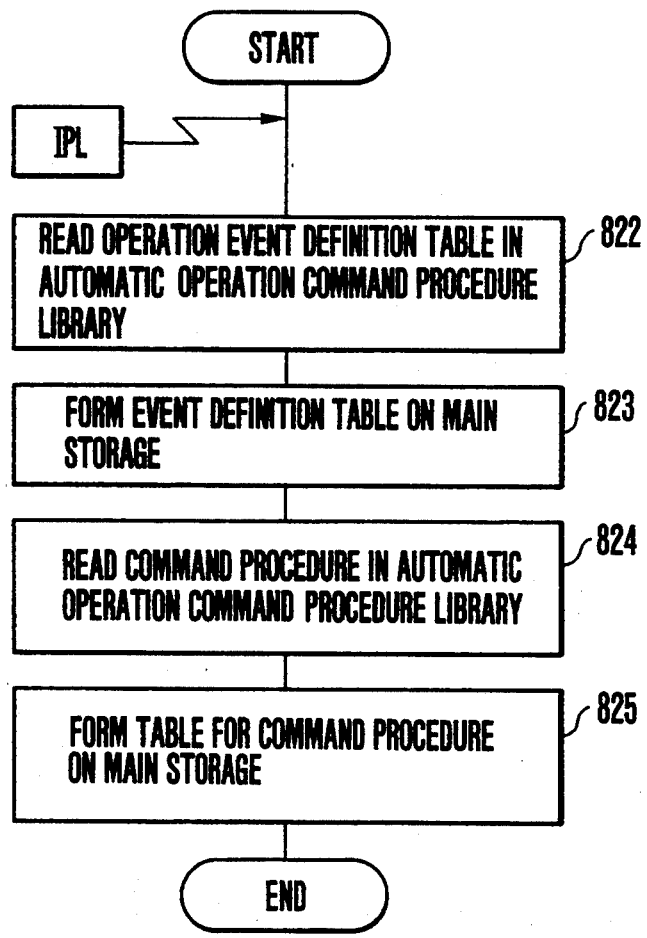
FIG. 8E shows a process flow of the procedure for reading the operation event definition table and each automatic operation command procedure upon starting the system.

FIG. 8E illustrates the process procedure of changing the automatic operation command procedure library 113. First, the automatic operation command procedure designated by a user to change it, is updated on the automatic operation command procedure library 113 in the external storage (step 820). Next, the change information at the entry whereat the name of the command procedure to be updated is stored in the operation event definition table 701 in the external storage, is made ON to indicate that there was a change (step 821).

FIG. 8E illustrates the process procedure of reading the operation event definition table 701 and each automatic operation command procedure in the automatic operation command procedure library, at the time of system start. The reason why the operation event definition table 701 and each command procedure are read in the main storage at the time of system start, is that the table and command procedure are made not to be inputted or outputted relative to the operation command procedure library during the system operation, to thereby improve the performance during system operation. First, upon start of the operation management program activated by IPL or the like, the operation event definition table 701 in the automatic operation command procedure library 113 is read (step 822). In accordance with the operation event definition table read at step 822, the operation event definition table 701 is formed on the main storage (step 823). Then, each automatic operation command procedure in the automatic operation command procedure library is read (step 824). In accordance with the read results at step 824, the table 702 for each automatic operation command procedure is formed in the main storage (step 825)

As described with reference to FIGS. 7 to FIG. 8E, the automatic operation command procedure is divisionally constructed of a table (operation event definition table 701) for the definition of events, and the automatic operation command procedure portion (automatic operation command procedure) for each event. As a result, it becomes possible to change the automatic operation command procedure during running of the operation management program, without restarting the operation management program. In addition, since the automatic operation command procedure is stored in the main storage, such change can be carried out without lowering the performance of system operation.

FIG. 9A illustrates the relationship between processing components of the composite computer system shown in FIG. 2 as applied to the automatic operation control system according to this invention. In the single computer system, it is apparent that the integral operation management program 201 corresponds to the operation management program 105. In FIG. 9A, reference numeral 101 represents an integral management system for integrally supervising the composite computer system. Reference numeral 902 represents one or more application systems, 205 represents an intersystem communications unit for communicating the automatic operation control information between the integral management system 101 and applications system 902, reference numeral 109 represents a configuration state information storage data base for storing the information of the configuration state of the composite computer system, and reference numeral 204 represents a display command unit for sequentially displaying the automatic operation state of the whole composite computer system, and giving a command to each computer system. Reference numeral 114 represents an automatic operation monitor control unit which supervises the configuration state of the central processing units, input/output control units, input/output devices of the whole integral computer system, and in accordance with a command from the management system, performs the power on/off control and switching of the input/output devices connected to the system. The automatic operation monitor control unit 114 is connected with input/output devices 107, communication control units 108, and alarm units 908 for generating sounds during an abnormal state upon a command from the management system 101. An integral operation management program 201 runs on the management system 101 for supervising the whole composite computer system. The integral operation management program 201 includes: an event analysis program 911 for receiving and analyzing an operation event from the operating system 104 and application programs 106; an intersystem communication control program 203 for controlling the communication of the automatic operation control information via the intersystem communication unit 205; a configuration state information access control program 913 for controlling access to the configuration state information storage data base 109; a display command unit Control program 914 for controlling a display on the display command unit 204 and a command from the display command unit 204; an automatic operation monitor control unit control program 915 for controlling a command to the automatic monitor control unit 114; an automatic operation command control program 916 which runs upon an instruction from the event analysis program 911 for controlling an operation to issue an automatic operation command while referring to the contents of the configuration state information storage data base 109; and an automatic operation command procedure library 112 for defining the operation of the automatic operation command control program 916.

A sub integral operation management program 202 runs on the application system 902, the program 202 serving as a substitute program for performing the function of the integral operation management program 201 when the management system 101 stops. Similar to the integral operation management program 201 on the management system 101, the sub integral operation management program 202 includes: an event analysis program 931, intersystem communication control program 932, sub configuration state information access control program 933, sub display command unit control program 934, automatic operation command control program 935, sub automatic operation monitor control unit control program 936, and automatic operation command procedure library 937. The sub configuration state information access control program 933 receives a configuration state information access request from the operating system and application program 940 of the application system, passes the access request via the intersystem communication program 932 to the configuration state information access control program 913 of the management system 101. The results are returned to the operating system or application program 940 of the application system 902. The sub display command unit control program 934 does not run in a normal state, but it runs when the management system 101 stops due to some abnormal conditions, and controls the display command control unit 204 in place of the display command unit control program 914.

Next, the control flow will be described. A command 950 is an event occurrence notice from the operating system and application program 106 on the management system 101. A command 951 is a write notice into the configuration state information storage data base 109 from the event analysis program 911 which received the event occurrence notice. A command 952 is a write command into the configuration state information storage data base 109. The commands 951 and 952 contain the discriminator of a computer system at which an event occurred. A command 953 is a notice from the event analysis program 911 to the automatic operation command control program 916. A command 954 is a read request from the automatic operation command procedure library 112. A command 955 is a command, from the automatic operation command control program 916, for the power on/off control of the computer system and input/output device, and switching of the system to be connected. Commands 956 and 957 are the configuration state information access request from the automatic operation command control program 916. A command 958 is a command for notifying to the automatic operation monitor control unit 114 of the command 955. A command 959 is a configuration state information access request from the operating system and application program 106 on the management system 101. A command 960 is a read request from the configuration state information storage data base 109 from the event analysis program 911. Line 961 represents the data read from the configuration state information storage data base 109, the read data being returned to the requesting sites via lines 962 and 963. A command 964 is a notice to display the contents of the event occurrence notice 950 on the display command unit 204, the command being identified to the display command unit 204 via line 965. The control flow on the application system 902 is substantially the same as the management system. A command 970 is an event occurrence notice from the operating system and application program 940 on the application system. A command 971 is a notice to the intersystem communication control program 932 for indicating an event to the management system 101. Line 972 represents the data written in the intersystem communication unit 205. The intersystem communication program 203 on the management system 101 reads an event from the application system 902 via line 973, and adds the discriminator for the application system to notify the event analysis program 911 by using a command 974. In this case, similar to the management system, the contents are identified to the display command unit 204 by using the commands 964 to 965. In parallel with this, the event analysis program 931 on the application system 902 notifies the automatic operation command control program 935 by using a command 975. Line 976 represents a read operation from the application system automatic operation command procedure library 937 by the automatic operation command control program 935 on the application system. A command 977 is an access request to the configuration state information storage data base 109. It is important to notice that only the configuration state information access control program 913 on the management system 101 actually accesses the configuration state information storage data base 109. The configuration state information access control program 933 on the application system 902 communicates with the intersystem communication control program 932 by the command 978, with the intersystem communication unit 205 by the command 980, with the intersystem communication control program 203 on the management system by the command 980, and with the event analysis program 911 by the command 981. The information is then fetched to the automatic operation command control program 935 on the application system by the order 960-961-962-982-983-984-985-986 in the paths. A command 002 from the automatic operation command control program 935 on the application system 902 to the automatic operation monitor control unit 114 is sent by the order 993-994-995-996-997-998-958 in the paths. In this case, a command may be notified to the automatic operation monitor control unit 114 directly from the application system 902 via a path 999. For the configuration state information access request 987 from the operating system and application programs 940 on the application system 902, the information is returned via the paths 989, 979, 980, 981, 960, 961, 962, 982, 983, 984, 990 and 991 in this order. In the above manner, every time an event occurs within each computer system, it is written in the configuration state information storage data base 109. The information is referred to by the automatic operation command control program 916. The commands are changed in accordance with the latest configuration and state and the past history, to thereby ensure an optimum automatic operation control.

The event analysis program 911 also has a function to give the access requests to the data base 109 on the basis of the commands 950 (event occurrence notice), and commands 959 (configuration state access request) from the operating system and application program 106, sequentially in the order of request, to the configuration information access control program 913.

Figure 9B:
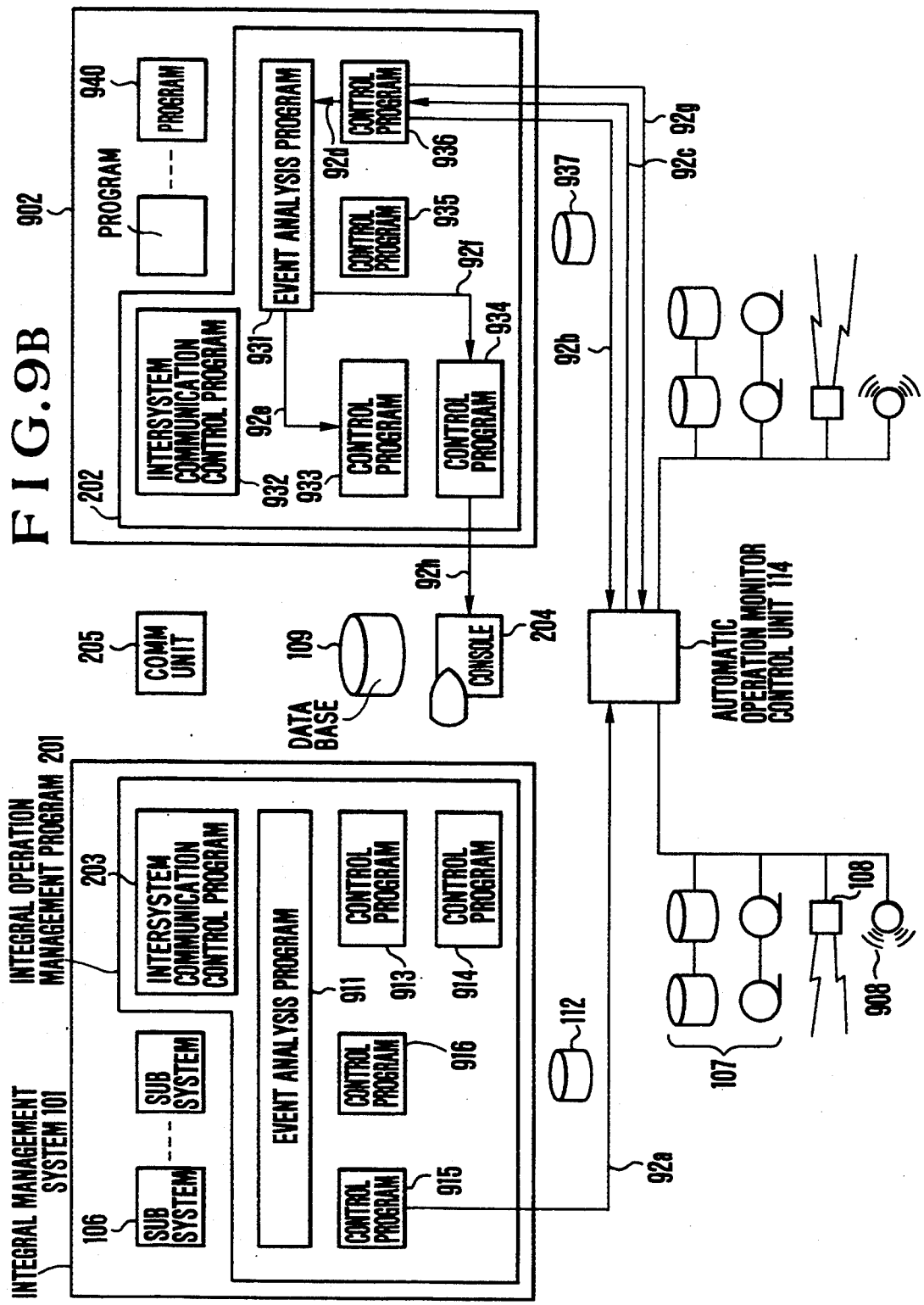
FIG. 9B illustrates dynamic switching to the management system which is a substitute system for performing the function of the integral operation management program.

The event analysis program 911 also gives the access requests to the information access control program 913 in the order of a predetermined priority instead of the above-described request order, when an urgent request to be described later comes from the intersystem communication control program Next, with reference to FIG. 9B, there will be described the dynamic switching from the integral operation management program 201 on the management system 101 to the sub integral operation management program 202 on the application program 902 which serves as a substitute program for the program 201 when the management system is under abnormal conditions or stops. The automatic operation monitor unit control programs 915 and 936 of the computer systems send health signals 92a and 92b at a predetermined time interval to the automatic operation monitor control unit 114. When the health signal 92a is intercepted due to the abnormal conditions or stoppage of the management system 101, the automatic operation monitor control unit 114 detects it and notifies the application system 902 of this condition via line 92c. The automatic operation monitor control unit program 936 of the application system 902 detects it, and indicates via line 82d the abnormal condition event or stoppage event at the management system 101 to the event analysis program 931. This notice is processed at the most urgent priority in order to perform at once a substitution process for the management system. The event analysis program 931 of the application system 902 has already read the contents of the configuration state information storage data base 109 immediately after initial program load IPL, and is storing what application system stands for a substitute for the management system. The following processes are performed by only the substituted management system. In FIG. 9B, it is assumed that the application system 902 stands for the substitute management system.

The event analysis program 931 notifies the configuration state information storage data base access control program 933 via line 92e to the effect that a substituted management system is required. After generating a command 92g to switch the system connected to the display command unit 204 to the substitute management system 902, at the automatic operation monitor control unit control program 936, it is sent via line 82f to the display command unit control program 934. Upon reception of the command 92e, the configuration state information access control program 933 does not, as in the previous manner, pass the access request to the configuration state information storage data base 109, and to the management system via the intersystem communication control program 932, but directly accesses the configuration state information storage data base 109 in the same manner as the configuration state information control program 913 of the management system 101. Upon reception of the command 92f, the display command unit control program 934 confirms the command 92g to switch a connection to a system, and thereafter establishes a communication path to the display command unit 204 to allow data transmission/reception via line 92h. The other control programs perform similar processes as described before. In the above manner, a substitution process for the management system can be realized.

Figure 9C:
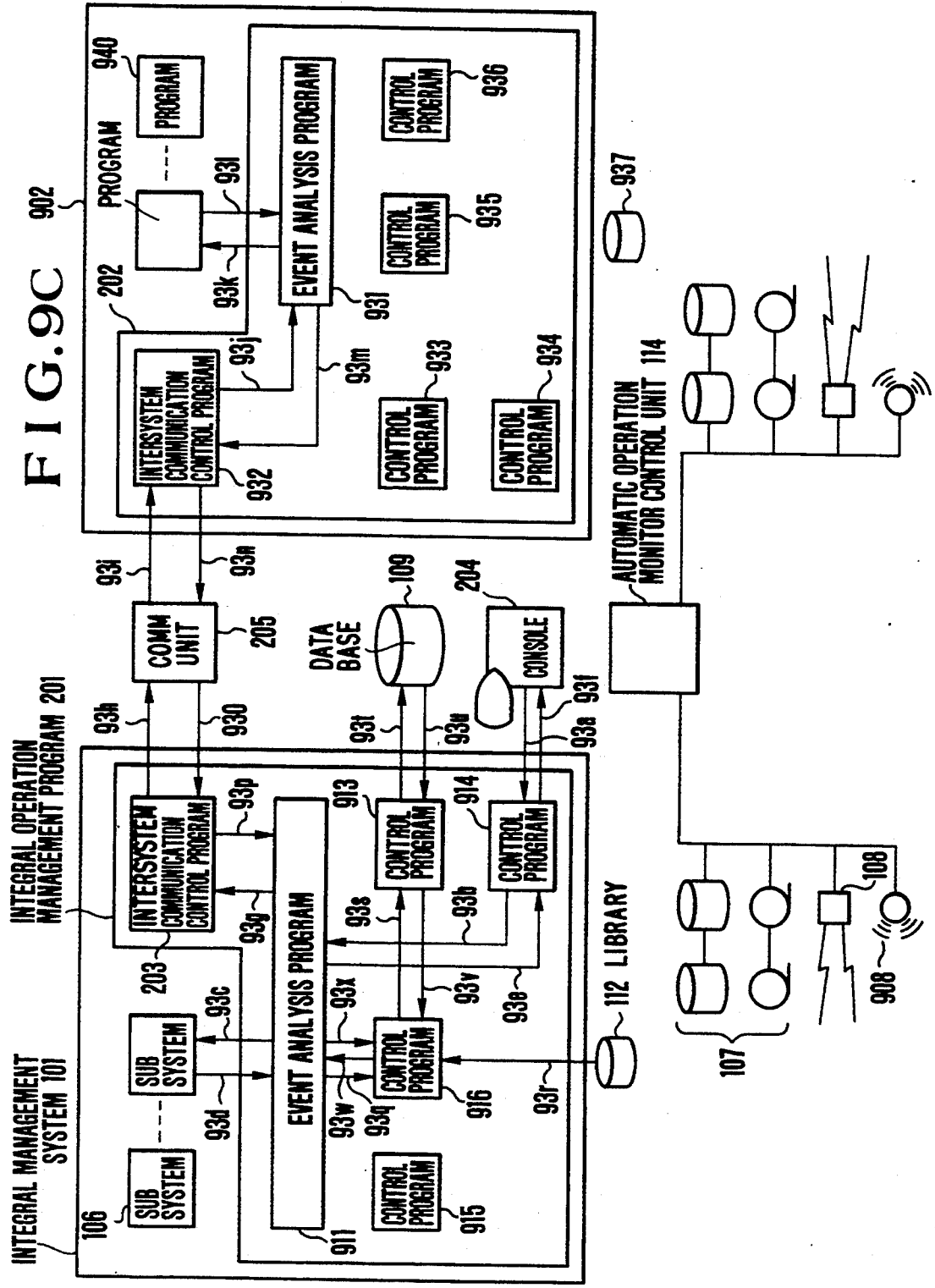
FIG. 9C illustrates the control flow for processing a command from a display command unit.

Next, the control flow for processing a command from the display command unit will be described with reference to FIG. 9C. Upon an input by an operator from the display command unit 204, the display command unit 204 analyzes the input contents, converts the discriminator of the associated computer system and the contents of the input into logical data to thereafter send them to the display command unit control program 914 via line 93a. In accordance with the transmitted contents, the display command unit control program 914 determines the contents of the command and the associated system and notifies it to the event analysis program 911 via line 93b. If the contents are to be processed at its own system, the event analysis program 911 transforms the contents into a command 93c to the operating system or application program 106 for the execution thereof. The execution result of the command is sent via the paths 93d, 93e and 93f to the display command unit 204 and is displayed thereon. If the system which executes the command is the application system, the event analysis program 911 sends the command to the operating system or application program 940 of the application system via the paths 93g, 93h, 93i, 93j and 93k. The execution result is entered into the paths 93l, 93m, 93n, 93o and 93p. The execution result is then sent to the display command unit 204 via the paths 93e and 93f to display it thereon. The display command unit 204 may issue a command to start the automatic operation command control program 916. In this case, the event analysis program 911 recognizes the command as a command for starting the automatic operation command control program 916, and passes the control to the program 916 via line 93q. The automatic operation command control program 916 reads the automatic operation command procedure library 112 via line 93r, and in accordance with the registered procedure, reads the contents of the configuration state information storage data base (via the paths 93s, 93t, 93u and 93v), or requests a command to the operating system and application program (via path 93w) to obtain the result (via path 93x). The automatic operation command control program 935 of the application program is started and executed in quite the same manner as above.

Next, the automatic operation of dynamically switching on-line systems used frequently in the on-line system will be described with reference to FIG. 9D.

In FIG. 9D, the management system 101 is a stand-by system in the on-line system, the application system 902 is the currently used system in the on-line system, and reference numeral 106 represents a stand-by on-line job. During the normal operation, both the systems send a health signal to the automatic operation monitor control unit 114 via lines 94a and 94b. When the currently used system stops, interruption of the health signal 94b is detected by the automatic operation monitor control unit 114, and notified to the stand-by system 101 via line 94c. The automatic operation monitor control program 915 on the stand-by system 101 notifies the event analysis program 911 via line 94d. The event analysis program 911 notifies the automatic operation command control program 916 via line 94e. The automatic operation command control program 916 reads the automatic operation command procedure library 112 to issue an automatic operation command. With this automatic operation command, the following processes are carried out.

(1) The type of an event is judged, and the storage of the application system is judged.

(2) The stoppage of the application system is written in the configuration state information storage data base 109. The stoppage is notified to the display command unit 204. If necessary, a command is issued via line 94i to the automatic operation monitor control unit 114 to generate an alarm.

(3) The configuration state information storage data base 109 is read via line 94j to recognize which system is the stand-by system. This read operation may be carried out at the start of computer system operation.

(4) A command to display an indication of dynamic switching of on-line systems, is issued to the display command unit 204.

(5) The configuration state information storage data base 109 is read via line 94l to identify the input/output device switched from the stopped application system to the stand-by system.

(6) The present state of the identified input/output device is checked. It is further checked after dynamic reconfiguration of systems if a DASD volume is switched to another device or if a communication control unit is switched.

(7) A request for a command to reset the central processing unit of the stopped on-line system is issued to the automatic operation monitor control unit 114 via line 94m.

(8) The configuration state information storage data base 109 is read to check the running state of other application programs on the stand-by system, and judges if the on-line job can be moved to the stand-by system.

(9) If there is no system resource capable of moving the on-line job to the stand-by system because of the space multiplicity degree of the stand-by system or the job type, then a command to terminate the execution of particular jobs is issued to the operating system via line 94p to provide ample margin in system resources.

(10) While considering the process at (6), a command to switch the input/output device identified at (5) to the stand-by system is issued to the automatic operation monitor control unit 114 via line 94n.

(11) An on-line job transfer is notified to the on-line job of the stand-by system via line 94g.

(12) For a message requesting an operator to respond to the on-line job transfer, a proper automatic response is carried out.

(13) Upon reception of a notice of a completion of the on-line job transfer, a command to erase the display of the indication of dynamic switching of on-line systems is issued to the display command unit 204 via line 94r.

(14) A command 94s to display a new on-line application system is issued to the display command unit 204, and a command to write the event in the configuration state information storage data base 109 is issued via line 94t.

In the above manner, an automatic system switching can be carried out even in the case of double accidents such as the stoppage of an application system while a dynamic reconfiguration of systems is being performed during the failure of an input/output device. In addition, during the application system transfer, the system resources at the transferred system can be automatically ensured, to thus allow flexible automatic operation.

FIGS. 10A to 15 show the process flow of the integrated operation management program 201.

Figure 10B:
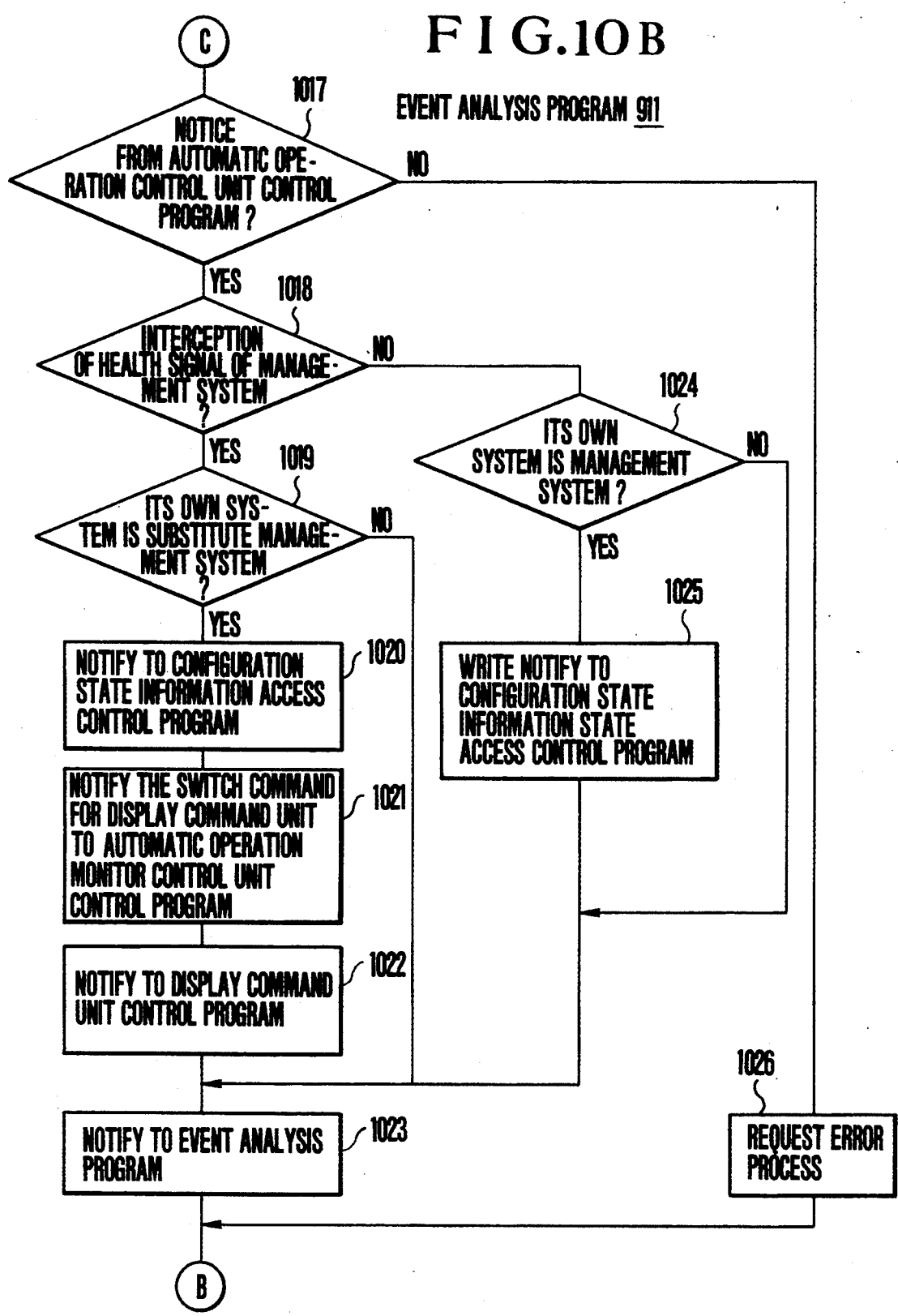

FIGS. 10A and 10B show the process flow of the event analysis program 911. The event analysis program 911 waits for an occurrence of an event or a request at step 1001. After being released from the wait state, it is checked if an event has occurred or not (step 1002). In the case of an occurrence of an event, an event occurrence system name is added, and an event occurrence is notified to the configuration state information access control program 913 (step 1003), and to the automatic operation command control program 916 (step 1004). If the release of the wait state is caused by a configuration state information access request (step 1005), the access request is notified to the configuration state information access control program 913 (step 1006). If the release of the wait state is caused by a request to the automatic operation monitor control unit 114 (step 1007), the request is notified to the automatic operation monitor unit control program 915 (step 1008). If the release of the wait state is caused by a display request to the display command unit 204 (step 1009), it is first checked whether its own system is the management system (step 1010). If it is the management system, the request is notified to the display command unit control program 914 (step 1011). If not, the request is notified to the intersystem communication program 203 (step 1012). If the release of the wait state is caused by a response to the configuration state information access request (step 1013), then the contents of the response are checked to judge if the request is directed to its own system (step 1014). If it is the response to a request to its own system, a requesting program stored in the contents of the response is obtained, and the response is returned (step 1015). If it is not a response to a request to its own system, in order to transfer it to the requesting system, the response is notified to the intersystem communication control program 203 (step 1016).

In the flow shown in FIG. 10B, if the release of the wait state is caused by a notice from the automatic operation monitor control unit control program 915 (step 1017), it is first judged if the health signal from the management system is interrupted (step 1018). If interrupted, it is judged if its own system is the substitute management system or not (step 1019). If its own system is the substitute management system, this effect is notified to the configuration state information access control program 913 (step 1020), a switching command for the display command unit 204 is notified to the automatic operation monitor control program 916 (step 1021) and also to the display command unit control program 914 (step 1022), and thereafter, the information is notified to the event analysis program 911 (step 1023). If the health signal of the management system is not interrupted, it is checked if its own system is the management system (step. 1024). If its own system is the management system, the interruption is notified to the configuration state information access control program 913 for writing the contents into the configuration state information storage data base 109 (step 1025), and thereafter, the process 1023 is performed. If the release of the wait state is caused for other reasons, a request error process is performed (step 1026). After performing the above processes, the next event or request is awaited.

Figure 11:
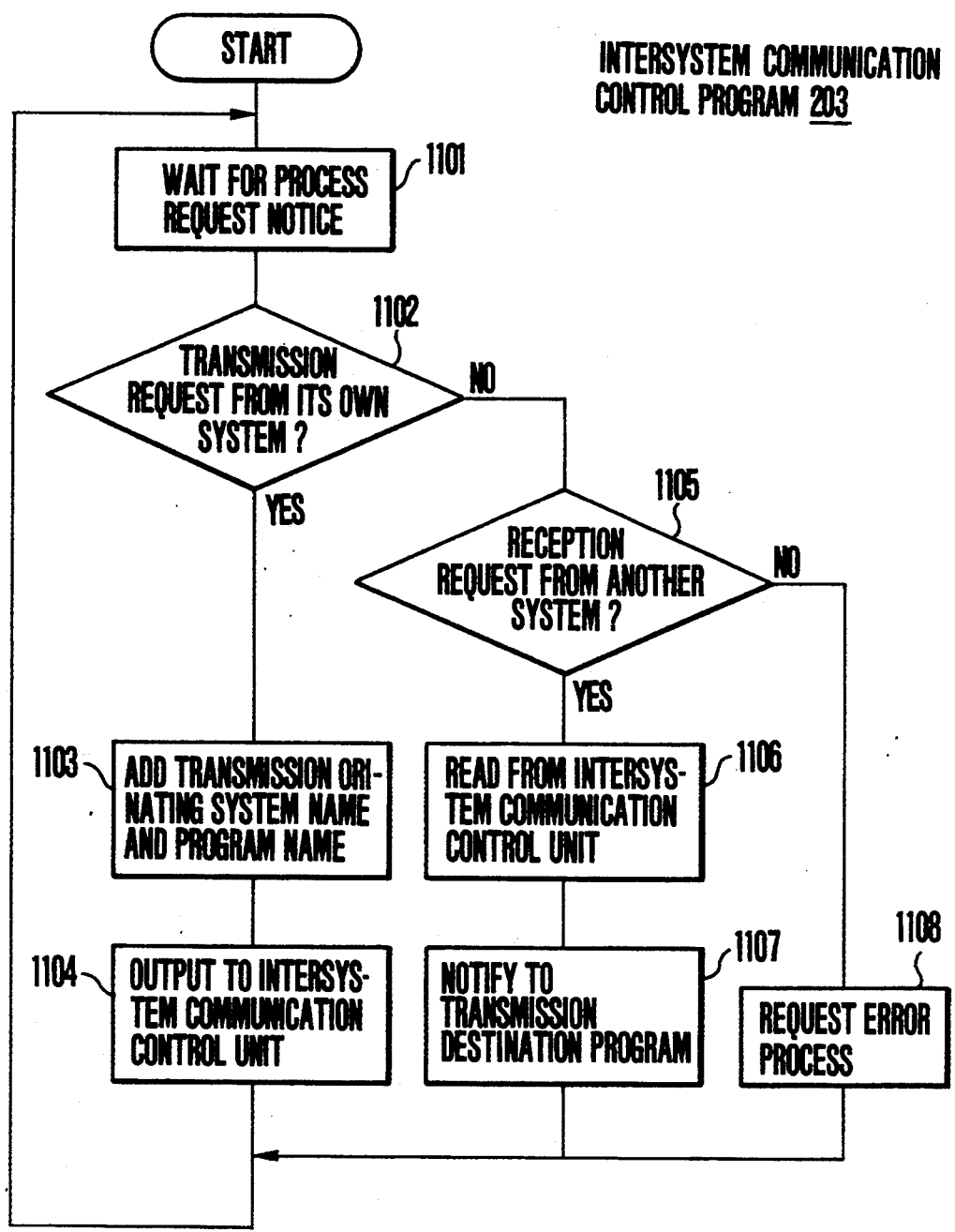

FIG. 11 illustrates the process flow of the intersystem communication control program 203. This intersystem communication control program waits for a process request notice. After the release of the wait state, it is checked if it is a transmission request from its own system (step 1102). If it is a request from its own system, the transmission destination system name and program name are already stored in the request data. As the information added to the response from the transmission destination system, the transmission originating system name and program name are added (step 1103), and the contents thereof are supplied to the intersystem communication control unit 205 to transmit the contents to the receiving system (step 1104). If the release of the wait state is caused by a reception request from another system (step 1105), the request contents are read from the intersystem communication control unit 205 (step 1106) to obtain the transmission destination program name contained therein, and the name is notified (step 1107). If the release of the wait state is not caused by a request from another system, an error process 1108 is performed. After the above processes, a next process request is awaited.

Figure 12:
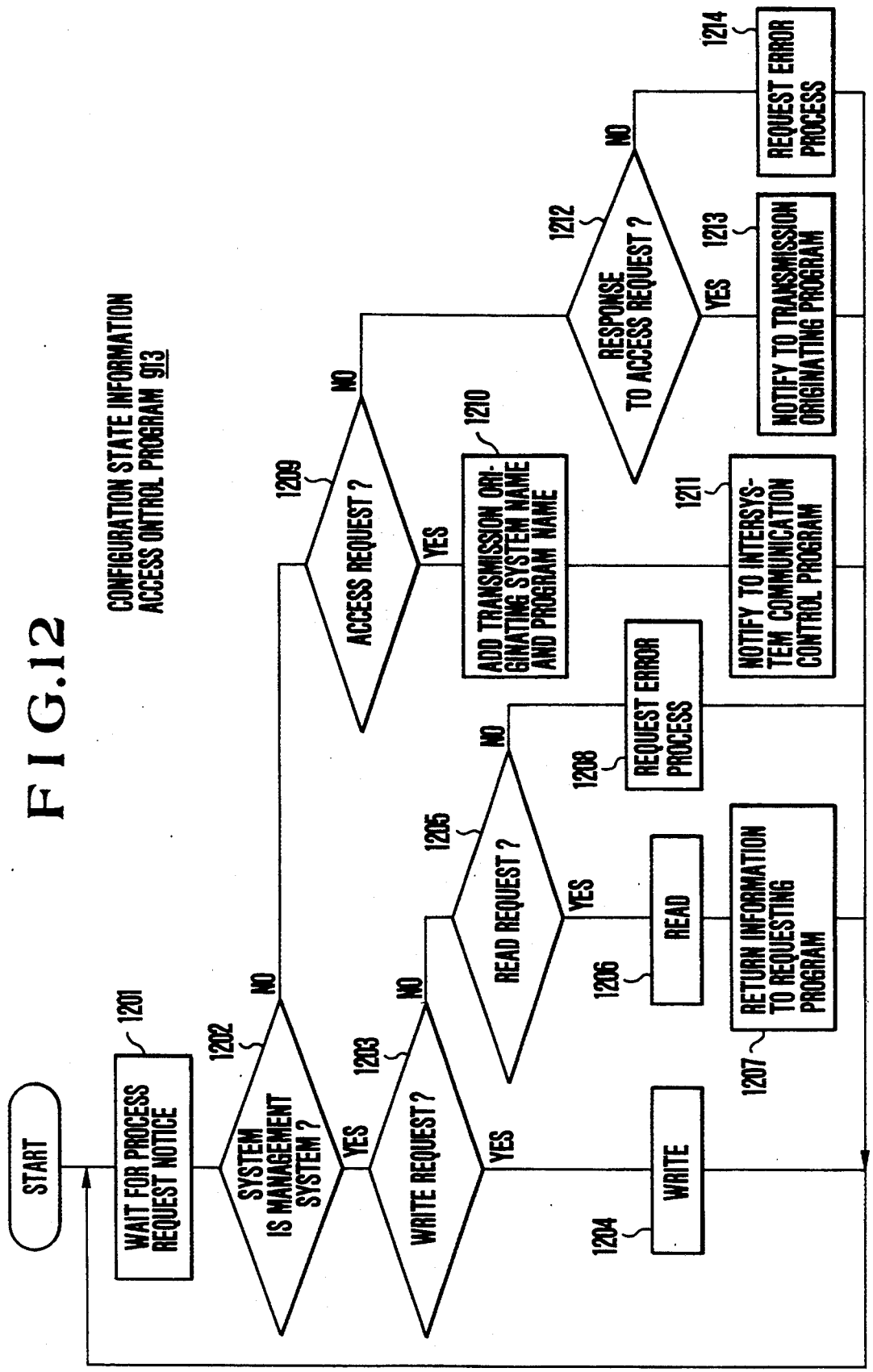

FIG. 12 illustrates a process flow of the configuration state information access control program 913. The configuration state information access control program waits for a process request notice at process 1201. After the release of the wait state, it is first checked if the currently operating system is the management system or not (step 1202). If the currently operating system is the management system, it is then checked if it is a write request or not (step 1203). If it is a write request, the contents of the request are written in the configuration state information storage data base 109 (step 1204). If it is a read request. (step 1205), the configuration state information storage data base 109 is read (step 1206), and the read contents are returned to the requesting program (step 1207). If it is neither a write request nor a read request, a request error process (step 1208) is performed. If the currently operating system is not the management system, it is checked if the request is an access request for the configuration state information (step 1209). If it is an access request, the transmission originating system name and program name are added (step 1210), and the access request is notified to the intersystem communication control program (step 1211). If not an access request, it is checked if the request is a response to an access request (step 1212). If it is a response, the response is notified to the transmission originating program (step 1213). If not, a request error process (step 1214) is performed. After the above processes, the next process request notice is awaited.

Figure 13:
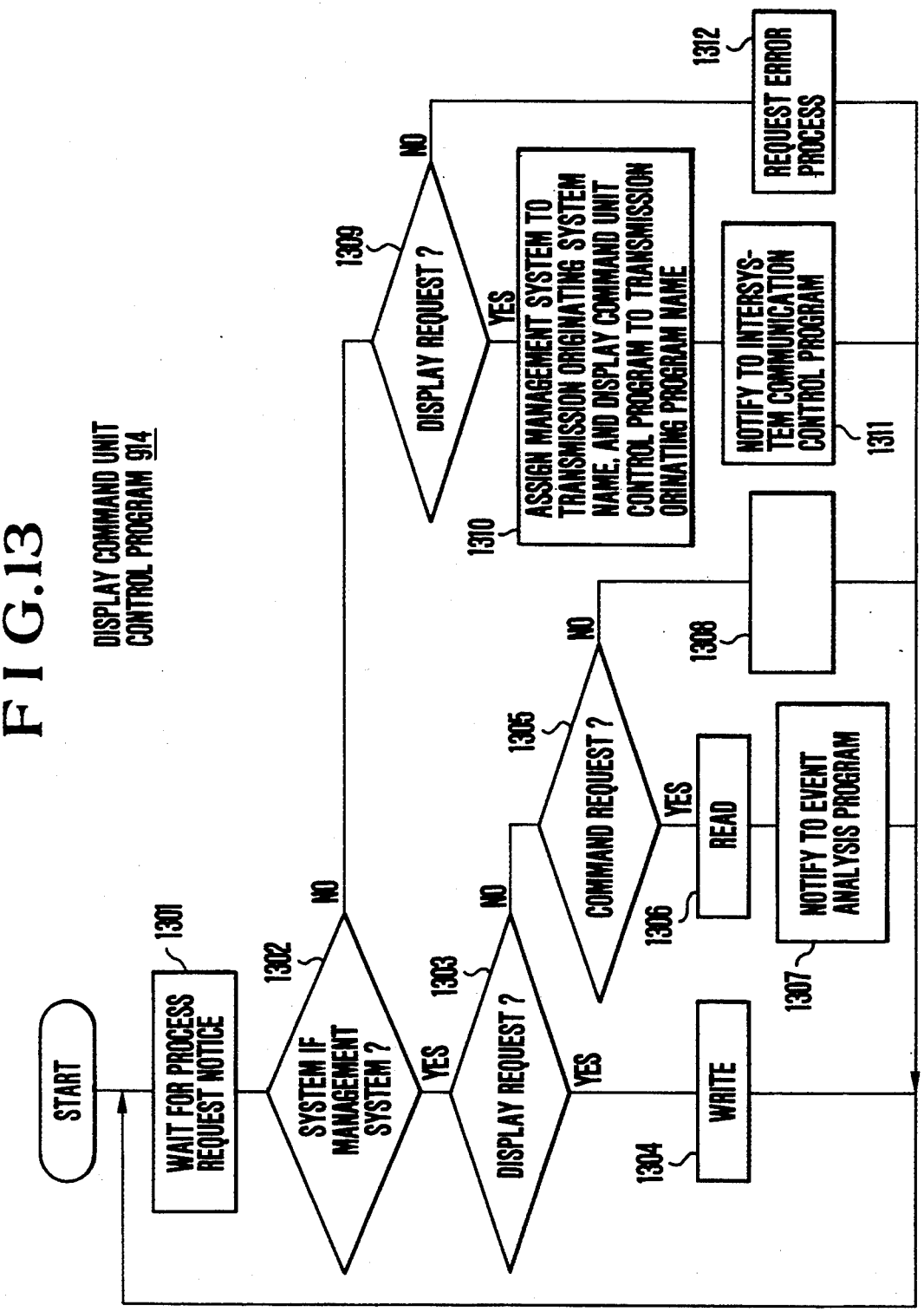

FIG. 13 illustrates the process flow of the display command unit control program 914. The display command unit control program waits for a process request notice at step 1301. After the release of the wait state, it is first checked if the currently operating system is the management system (step 1302). If it is the management system, it is checked if the request is the display request or not (step 1303). If it is the display request, it is transmitted to the display command unit 204 (step 1304). If the request is a command request (step 1305), the command contents are read from the display command unit (step 1306) to notify the contents to the event analysis program 911 (step 1307). If the request is neither a display request nor the command request, a request error process is performed (step 1308). If the currently operating system is not the management system, it is checked if the request is a display request (step 1309). If the request is a display request, the management system is assigned to the transmission originating system name, and the display command unit control program 914 is assigned to the transmission destination program name (step 1310), and the intersystem communication control program 203 is notified (step 1311). If the request is not a display request, a request error process is performed (step 1312). After the above processes, the next process request notice is awaited.

Figure 14:
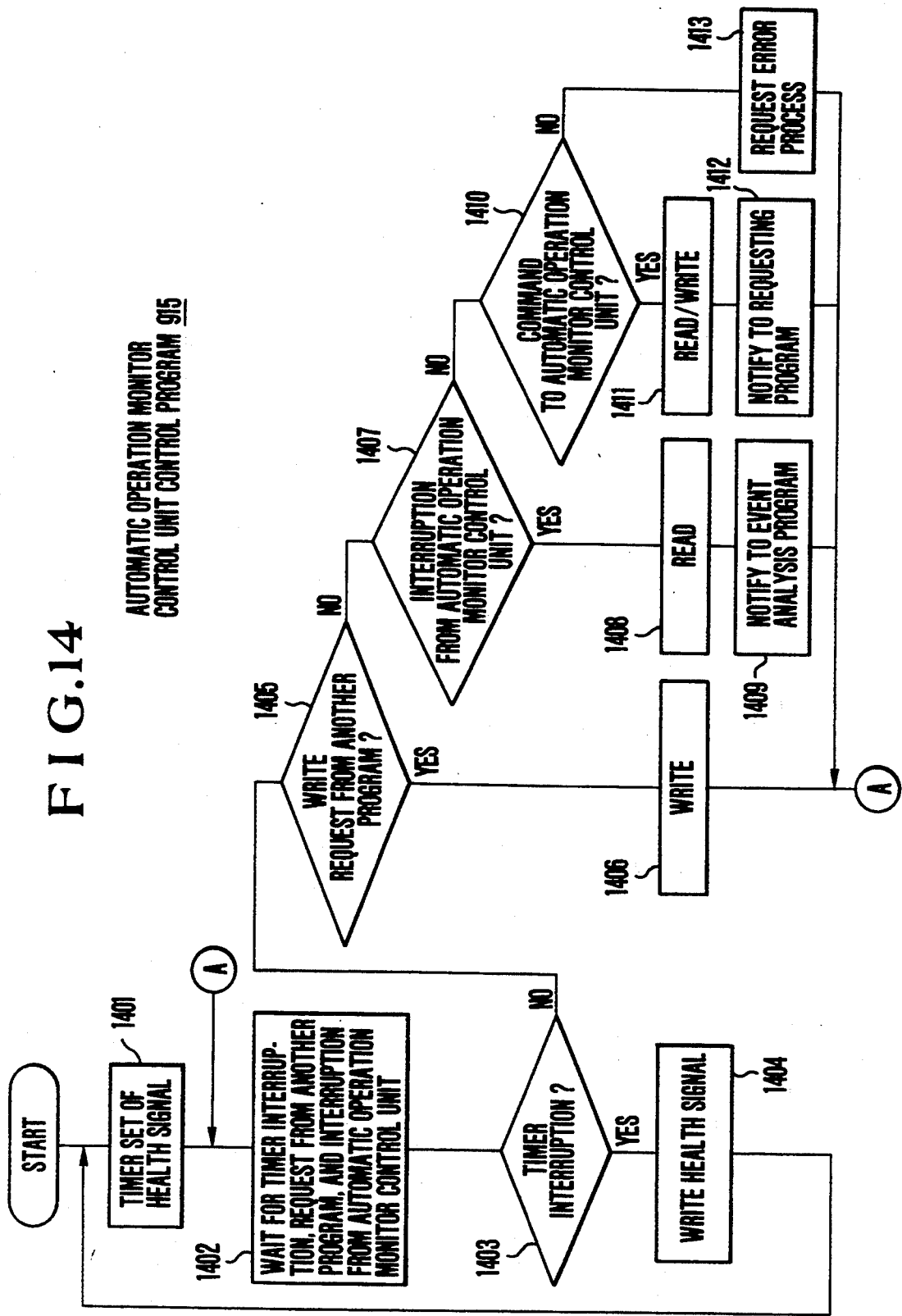

FIG. 14 illustrates the process flow of the automatic operation monitor control unit control program 915. After setting the timer for the health signal, the program 915 waits for a timer interruption, a request from another program, and an interruption from the automatic operation monitor control unit (step 1402). If the release of the wait state is caused by a timer interruption (step 1403), a health signal is transmitted to the automatic operation monitor control unit 114 (step 1404). If the release of the wait state for returning to the timer set process is caused by a write request from another program (step 1405), the contents are transmitted to the automatic operation monitor control unit 114 (step 1406). If the release of the wait state is caused by an interruption from the automatic operation monitor control unit 114 (step 1407), it means that there has occurred a change in hardware state so that the contents thereof are read (step 1408) and notified to the event analysis program 911 (step 1409). If the release of the wait state is caused by a command request to the automatic operation monitor control unit 114 (step 1410), a transmission/reception relative to the automatic operation monitor control unit is carried out in accordance with the request (step 1411). The result is notified to the requesting program (step 1412). In the other case, a request error process is performed (step 1413). In a process other than the timer interruption, the next request occurrence is awaited.

Figure 15:
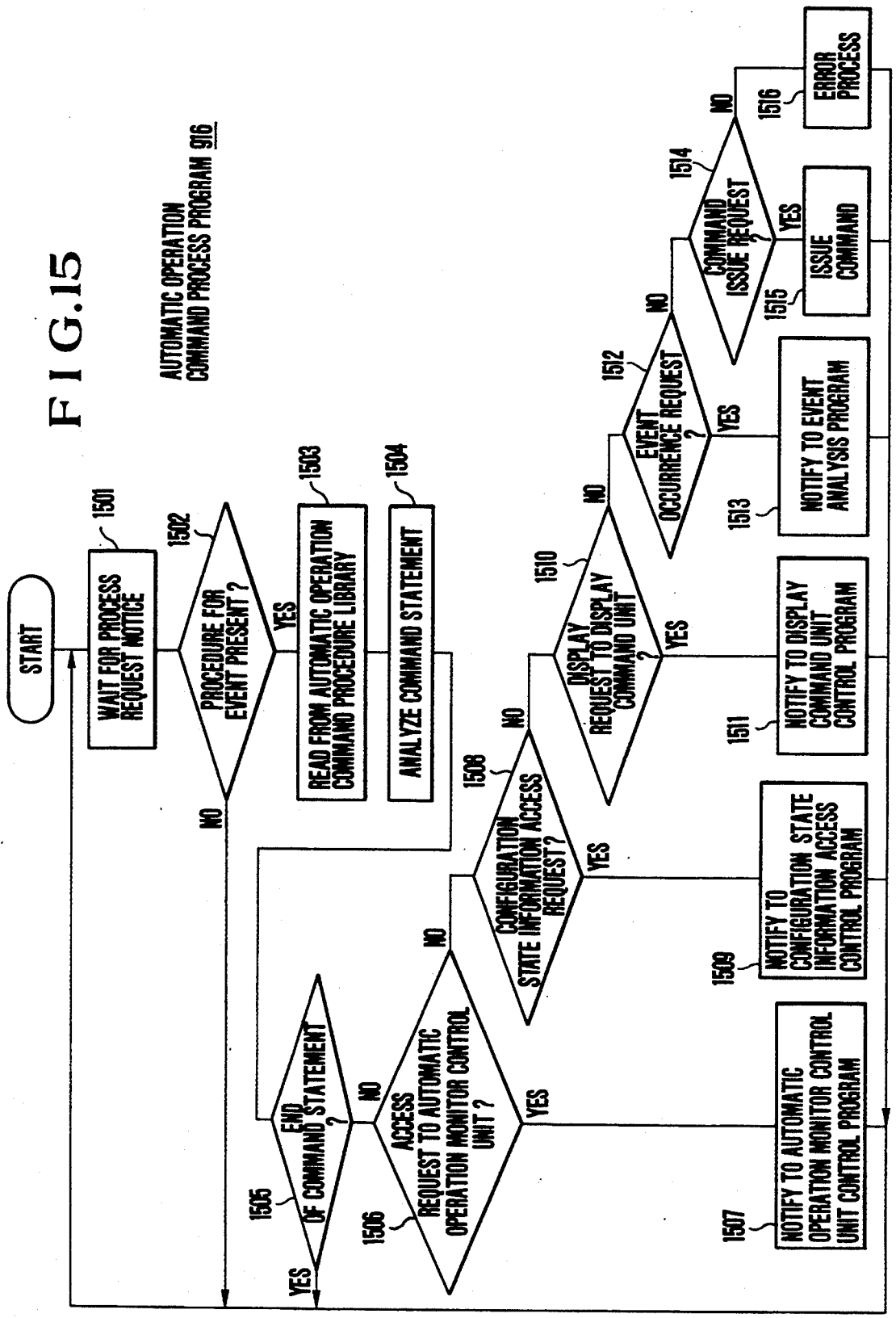

FIG. 15 illustrates a process flow of the automatic operation command control program 916. The automatic operation command control program waits for a process request notice at step 1501. After the release of the wait state, the operation event definition table 701 is searched to check if the procedure corresponding to the notified event is registered therein (step 1502). If not, the process request notice is again awaited. If registered, the contents are read from the automatic operation command procedure library 112 (step 1503) to analyze the command statement (step 1504). In accordance with the procedure at step 1505, the following processes are executed until the end of the command statement. If the command statement is an access request to the automatic operation monitor control unit 114 (step 1506), the access request is notified to the automatic operation monitor unit control program 915 (step 1507). If the command statement is an access request to the configuration state information (step 1508), the access request is notified to the configuration state information access control program 915 (step 1509). If the command statement is a display request to the display command unit (step 1510), the display request is notified to the display command unit control program 914 (step 1511). If the command statement is an event occurrence request (step 1512), the request is notified to the event analysis program 911 (step 1513). If the command statement is a command issue request (step 1514), such a command is issued (step 1515). For other requests, a request error process is performed (step 1516).

According to the present invention, the configuration and state of hardware and software in a computer system are integrally supervised. Upon occurrence of various events in the computer system, an optimum automatic operation control is carried out in accordance with the past and present states of the computer system while following the procedure registered beforehand or a procedure which has been changed with reference to the configuration state information, thereby advantageously reducing the man power in operating the computer system and realizing manless operation. Further, the configuration state information of the present invention can be formed in synchro with configuring a computer system so that a change in system configuration due to a system scale enlargement can be flexibly dealt with, thereby advantageously reducing work times in changing the configuration and reducing erroneous works. Furthermore, the automatic operation command procedure library of the present invention can be changed or added to without reconfiguring the operation management program, thereby advantageously allowing an automatic operation without imposing any constraint against the operation of a continuously operating system. Still further, according to the present invention, even in a composite computer system, integral and automatic operation is possible by collectively supervising the configuration state information. Particularly, during the dynamic switching of on-line systems, a reliable switching process can be performed while taking into consideration the structure of input/output devices and failures, thereby advantageously reducing a recovery time from failures and preventing an erroneous recovery operation.

We claim:

1. An automatic operation control system for a computer system having a central processing unit, a main storage and an input/output device, comprising:
    means for detecting, as an event, a change of either a running status of said computer system or a use of resources in said computer system;
    logging means for storing detected events in the order of their occurrence;
    storing means for storing a plurality of command procedures each of which corresponds to a type of event, each of said command procedures comprises a series of commands to operate said computer system;
    means for determining, upon occurrence of a new event which requires an action in the operation of said automatic operation control system, a type of event, which corresponds to the new event;
    means for selecting a command procedure corresponding to the type of event determined by said determining means out of said command procedures stored in the storing means; and
    processing means for interpreting and executing the command procedure selected by said selecting means in such a manner that an action to be taken is determined in lieu of an operator by referring to a plurality of events related to said new event and stored in the logging means.

2. An automatic operation control system according to claim 1, wherein said event comprises notifying that a use rate of the central processing unit exceeds a predetermined upper limit value.

3. An automatic operation control system according to claim 1, wherein said event comprises indicating an abnormality of an input/output device.

4. An automatic operation control system according to claim 1, wherein said command procedure includes a conditional statement which is used by said system to determine whether the command procedure selected by said selecting means has been changed so that when the selected command procedure has been changed, a new command procedure is read out of an operation procedure library.

5. An automatic operation control system according to claim 1, wherein said command procedure includes a statement to issue an alarm message forwarded to an operator.

6. An automatic operation control system according to claim 1, wherein said command procedure includes a statement to take an action for said event.

7. An automatic operation control system according to claim 1, wherein said selecting means includes a table which defines a location of the command procedure corresponding to each event.

8. An automatic operation control system for a composite computer system having a first computer system and a second computer system, comprising:
   storage means for storing status information of a hardware configuration and software configuration, including an availability of input/output devices connected to said first and second computer systems, and a running status of first and second application programs respectively run on said first and second computer systems;
   said first computer system including:
      means for running the first application program when the first computer system is in a normal operation state,
      means for updating the storage means so that the hardware configuration and software configuration may reflect a current status when the first computer system is in the normal operation state; and
   said second computer system including:
      means for updating the storage means so that the hardware configuration and software configuration may reflect the current status continuously, not only when the first computer system is in the normal operation state, but also after the first computer system has come to a stop,
      means for watching whether the first computer system is in the normal operation state or not by observing signals notified to the second computer system,
      means for recognizing that the first computer system has come to a stop in response to the watching means and recognizing that the first application program run on said first computer system is in a failure by referring to said storage means,
      means for checking the running status of the second application program on the second computer system by referring to said storage means, which stores the running status,
      means for terminating the second application program on the second computer system if a system resource of the second computer system is not available enough to execute the first application program on the second computer system, and
      means for running the first application program on the second computer system.

9. An automatic operation control system according to claim 8, wherein said updating means updates the storage means to indicate the availability of input/output devices in accordance with the input/output devices whose connection is switched from the first computer system to the second computer system.

10. An automatic operation control system for a plurality of computer systems, one of which is a computer system operating as an integral management computer system, comprising:
   each of said computer systems including means for sending events which have occurred within the computer system to the integral management computer system;
   logging means for storing the events in the order of their occurrence; and
   storing means for storing a plurality of command procedures each of which corresponds to a type of event, each of said command procedures comprising a series of commands to operate said computer systems;
   said integral management computer system including means for receiving events sent from other computer systems, storing them in said logging means, determining, upon occurrence of a new event which requires an action in the operation of said automatic operation control system, a type of event, which corresponds to the new event, selecting a command procedure corresponding to the determined type of event out of said command procedures stored in the storing means, interpreting the selected command procedure so that an action to be taken is determined in lieu of an operator by referring to a plurality of events related to said event, and issuing an order to the related computer system to change the computer operation based on the command procedure.

11. An automatic operation control system according to claim 10, wherein at least one of said other computer systems further includes said means provided with said integral management computer system so that said one of said other computer systems may continue to operate said computer systems by taking over the role of the integral management computer system and current logging means after said integral management computer system has come to a stop.

12. An automatic operation control system for a computer system, comprising:
   means for detecting, as an event, a change of either a running status of said computer system or a use of resources in said computer system; and
   logging means for storing said detected events in the order of their occurrence;
   said computer system including an integral management computer system which includes:
      storing means for Storing a plurality of command procedures each of which corresponds to a type of event, each of said command procedures comprising a series of commands to operate said computer system,
      means for determining, upon occurrence of a new event which requires an action in the automatic operation control system, a type of event, which corresponds to the new event,
      means for selecting a command procedure corresponding to the type of event determined by said determining means out of said command procedures stored in the storing means, and
      processing means for interpreting and executing the command procedure selected by said selecting means in such a manner that an action to be taken is determined in lieu of an operator by referring to a plurality of events related to said event and stored in the logging means.

13. An automatic operation control system for a composite computer system having a first computer system and a second computer system, comprising:

first storage means for storing status information of a hardware configuration and software configuration, including an availability of input/output devices connected to said first and second computer systems, and a running status of first and second application programs respectively run on said first and second computer systems;

said first computer system including:

means for updating the first storage means so that the hardware configuration and software configuration may reflect a current status when the first computer system is in a normal operation state, and means for running the first application program when the first computer system is in a normal operation state;

said second computer system including:

means for updating the first storage means so that the hardware configuration and software configuration may reflect a current status continuously not only when the first computer system is in a normal operation state but also after the first computer system has come to a stop, means for watching whether the first computer system is in the normal operation state or not by observing signals notified to the second computer system, means for recognizing that the first computer system has come to a stop in response to the watching means and recognizing that the first application program on said first computer system is in a failure by referring to said first storage means, means for checking the running status of the second application program on the second computer system by referring to said storage means which stores the running status, means for terminating the second application program on the second computer system if system resource of the second computer system is not available enough to execute the first application program on the first computer system, and means for running the first application program on the second computer system;

means for detecting, as an event, a change of either a running status of said first and second computer systems or a use of resources in said first and second computer systems;

logging means for storing said detected events in the order of their occurrence;

second storage means for storing a plurality of command procedures each of which corresponds to a type of event, each of said command procedures comprising a series of commands to operate said computer system;

means for determining, upon occurrence of a new event which requires an action in the automatic operation system, a type of event, which corresponds to the new event, means for selecting a command procedure corresponding to the type of event determined by said determining means out of said command procedures stored in the storing means; and processing means for interpreting and executing the command procedure selected by said selecting means in such a manner that an action to be taken is determined in lieu of an operator by referring to a plurality of events related to said event and stored in the logging means.

* * * * *